(12) United States Patent
Sawada et al.

(10) Patent No.: US 12,450,021 B2
(45) Date of Patent: Oct. 21, 2025

(54) DISPLAY TERMINAL, COMMUNICATION SYSTEM, AND DISPLAY METHOD

(71) Applicants: Kyoya Sawada, Kanagawa (JP); Hiroshi Hinohara, Kanagawa (JP); Takeshi Homma, Hyogo (JP); Takeshi Horiuchi, Tokyo (JP); Takashi Hasegawa, Kanagawa (JP)

(72) Inventors: Kyoya Sawada, Kanagawa (JP); Hiroshi Hinohara, Kanagawa (JP); Takeshi Homma, Hyogo (JP); Takeshi Horiuchi, Tokyo (JP); Takashi Hasegawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/604,514

(22) Filed: Mar. 14, 2024

(65) Prior Publication Data
US 2024/0319943 A1      Sep. 26, 2024

(30) Foreign Application Priority Data

Mar. 22, 2023 (JP) ................. 2023-046058
Dec. 25, 2023 (JP) ................. 2023-218528

(51) Int. Cl.
*G06F 3/14* (2006.01)
(52) U.S. Cl.
CPC ...................... *G06F 3/14* (2013.01)
(58) Field of Classification Search
CPC ......... G10L 15/26; G10L 15/22; G06F 40/58; G06F 3/0482; G06F 3/167; G06Q 10/1095; G06Q 10/101; G06Q 50/01; H04L 67/306; H04L 65/1069; H04M 3/567; H04M 2203/205
See application file for complete search history.

(56) References Cited

U.S. PATENT DOCUMENTS

2005/0251009 A1\* 11/2005 Morita ................... G16H 80/00
                                                                600/407
2018/0268819 A1\* 9/2018 Nakashima ............. G10L 15/26
(Continued)

FOREIGN PATENT DOCUMENTS

JP          2019-192229 A      10/2019

OTHER PUBLICATIONS

Extended European Search Report issued Jul. 22, 2024 in European Patent Application No. 24162245.5, 9 pages.

*Primary Examiner* — Sujit Shah
(74) *Attorney, Agent, or Firm* — XSENSUS LLP

(57) ABSTRACT

A display terminal for playing back a predetermined area of a wide-view image that is recorded, includes: a display to display a first display area and a second display area, the first display area being related to a first recording duration in which a speech is made when a first predetermined area of the wide-view image is being displayed by a first display terminal, the second display area being related to a second recording duration in which a speech is made when a second predetermined area of the wide-view image is being displayed by the first display terminal; and circuitry that receives selection of the second display area during display of a first predetermined-area image, and controls the display to display a second predetermined-area image in response to receipt of selection of the second display area.

13 Claims, 32 Drawing Sheets

(56) References Cited

U.S. PATENT DOCUMENTS

| | | |
|---|---|---|
| 2019/0324963 A1 | 10/2019 | Mano |
| 2020/0296284 A1* | 9/2020 | Aikawa ................ H04N 23/661 |
| 2022/0311970 A1 | 9/2022 | Morita et al. |
| 2022/0394178 A1 | 12/2022 | Annaka et al. |
| 2023/0308622 A1 | 9/2023 | Sawada et al. |

* cited by examiner

HEMISPHERICAL IMAGE (FRONT)

HEMISPHERICAL IMAGE (BACK)

CAPTURED IMAGE

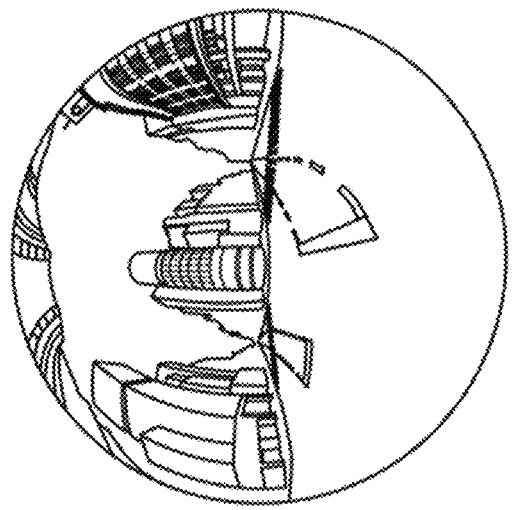
FIG. 4A
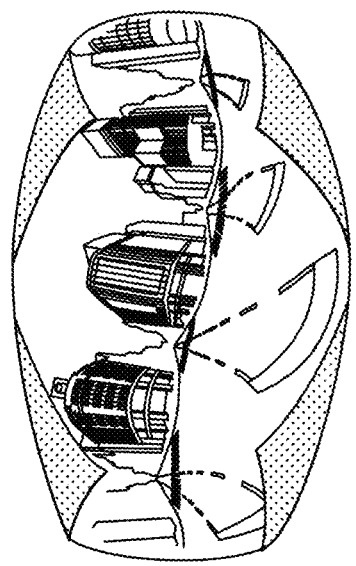
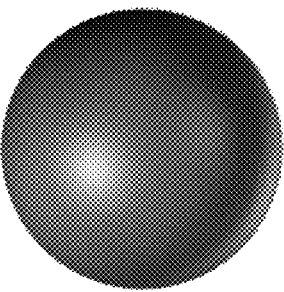
FIG. 4B
EQUIRECTANGULAR PROJECTION IMAGE EC
SPHERICAL IMAGE CE

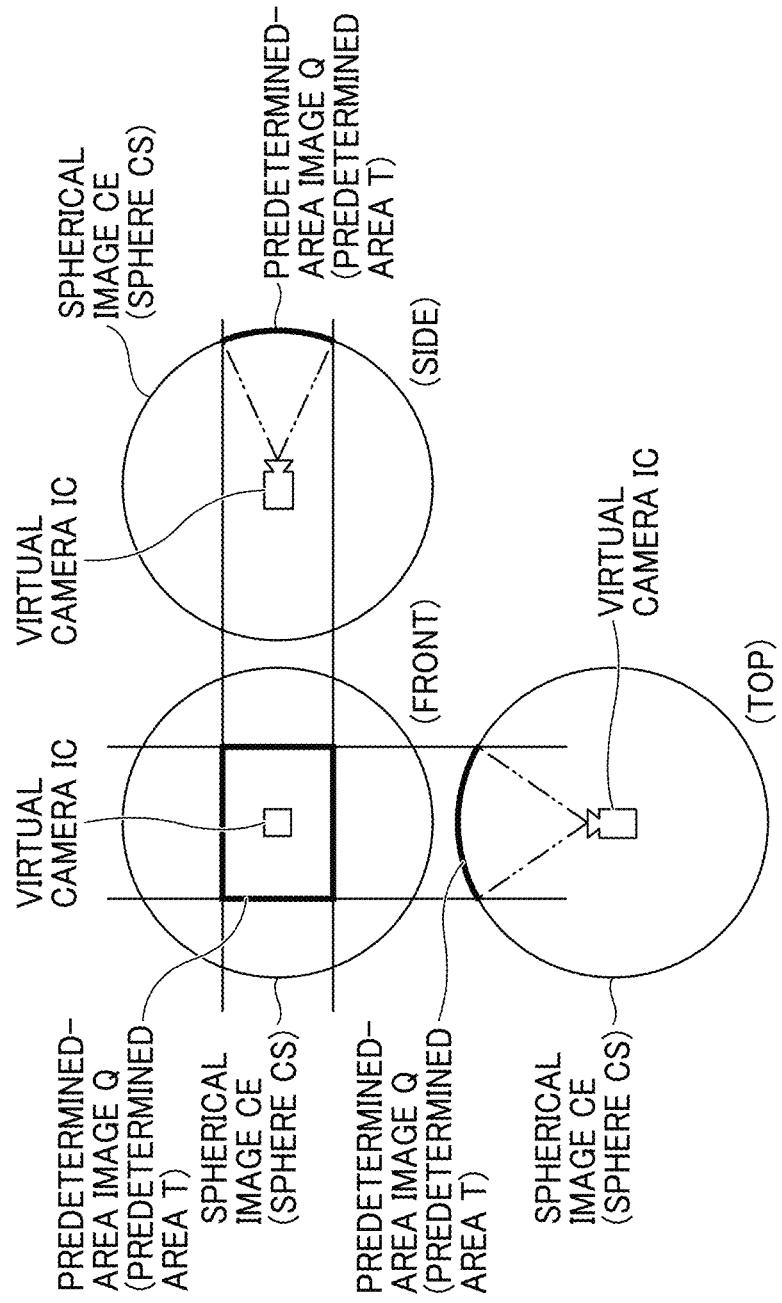

VIRTUAL CAMERA IC
SPHERE CS
PREDETERMINED-AREA IMAGE Q (PREDETERMINED AREA T)

VIRTUAL CAMERA IC
SPHERE CS
PREDETERMINED-AREA IMAGE Q' (PREDETERMINED AREA T')

FIG. 14
| DEVICE ID/USER ID | PASSWORD | NAME | USER IMAGE | IP ADDRESS |
|---|---|---|---|---|
| 111d | pw111d | IMAGE CAPTURING APPARATUS α | | 1.1.1.1. |
| 112d | pw112d | IMAGE CAPTURING APPARATUS β | | 1.2.1.1. |
| 100x | pw100x | HOST X | 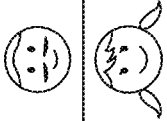 | 1.1.1.2. |
| 100a | pw100a | PARTICIPANT A | 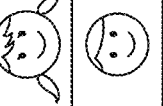 | 1.1.2.1. |
| 100b | pw100b | PARTICIPANT B | 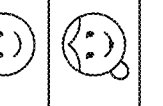 | 1.1.2.2. |
| 100c | pw100c | PARTICIPANT C | 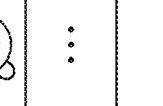 | 1.1.2.3. |
| ... | ... | ... | ... | ... |

FIG. 15

| VIRTUAL ROOM ID | VIRTUAL ROOM NAME | DEVICE ID | HOST ID | PARTICI-PANT ID | CONTENT ID | CONTENT URL | ANGLE-OF-VIEW INFORMATION URL |
|---|---|---|---|---|---|---|---|
| 111r | CONSTRUCTION SITE α | 101d | 100x | 100a, 100b | C101 | ... | ... |
| 112r | CONSTRUCTION SITE η | 102d | 100y | 100e, 100f | C102 | ... | ... |
| ... | ... | ... | ... | ... | ... | ... | ... |

FIG. 16

| CONTENT ID: C111 | | ANGLE-OF-VIEW INFORMATION | | | TIME STAMP (ELAPSED RECORDING TIME/ELAPSED PLAYBACK TIME) |
|---|---|---|---|---|---|
| USER ID | IP ADDRESS | pan($\phi$) | tilt($\theta$) | fov($\alpha$) | |
| 100x | 1.2.3.1 | 20 | 30 | 60 | 2022/10/31 15:00 |
| 100a | 1.2.3.2 | 30 | 40 | 55 | 2022/10/31 15:00 |
| 100c | 1.2.3.4 | 65 | 50 | 25 | 2022/10/31 15:00 |
| ... | ... | ... | ... | ... | ... |

FIG. 17

| CONTENT ID: C111 | | | |
|---|---|---|---|
| USER ID | IP ADDRESS | TEXT DESCRIPTION | TIME STAMP (ELAPSED RECORDING TIME/ELAPSED PLAYBACK TIME) |
| 100x | 1.2.3.1 | Are you concerned about something? | 2022/10/31 15:00:00-15:00:03 |
| 100a | 1.2.3.2 | No. | 2022/10/31 15:00:20-15:00:22 |
| 100c | 1.2.3.4 | Truck tires. | 2022/10/31 15:00:25-15:00:28 |
| ... | ... | ... | ... |

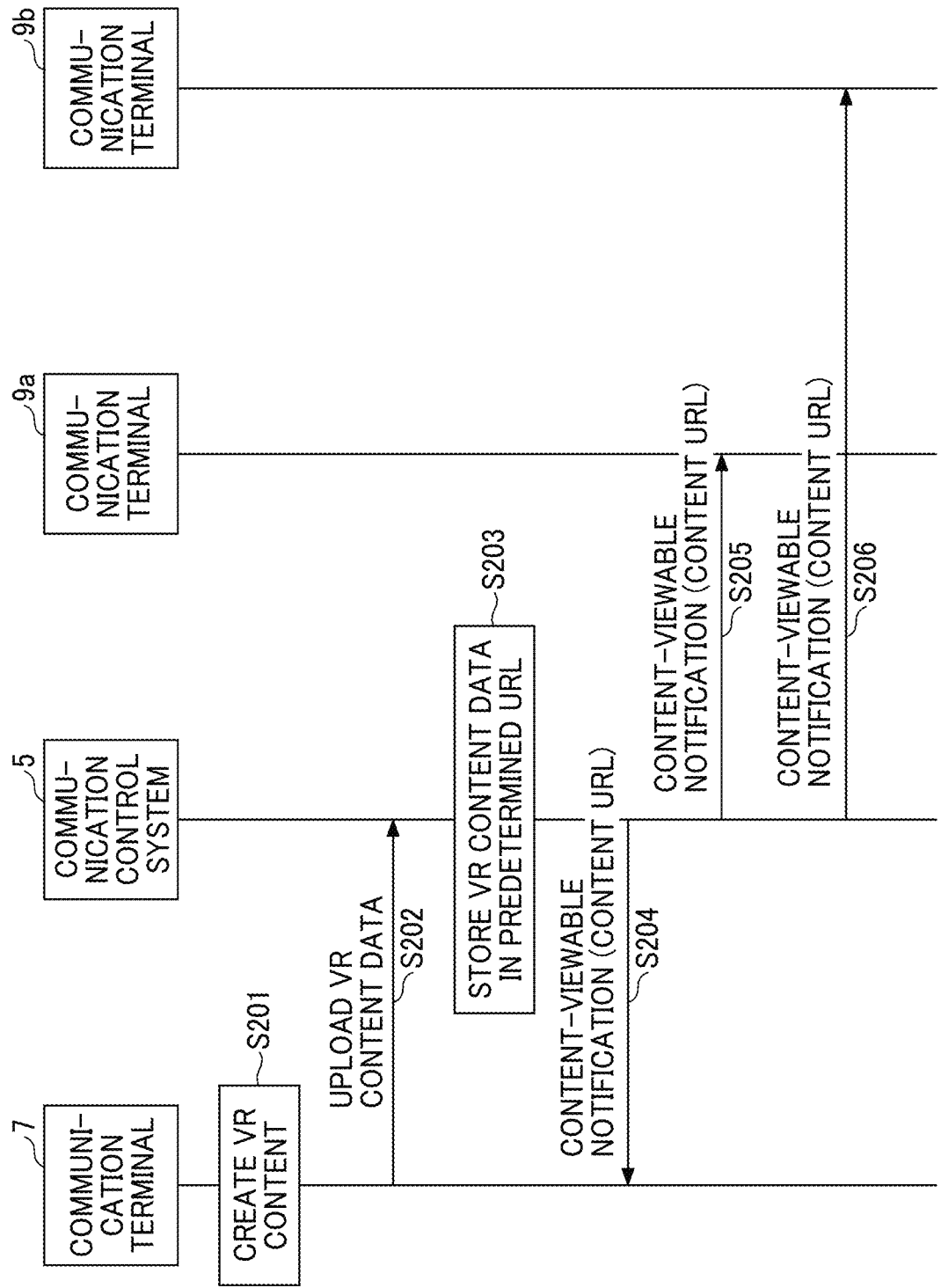

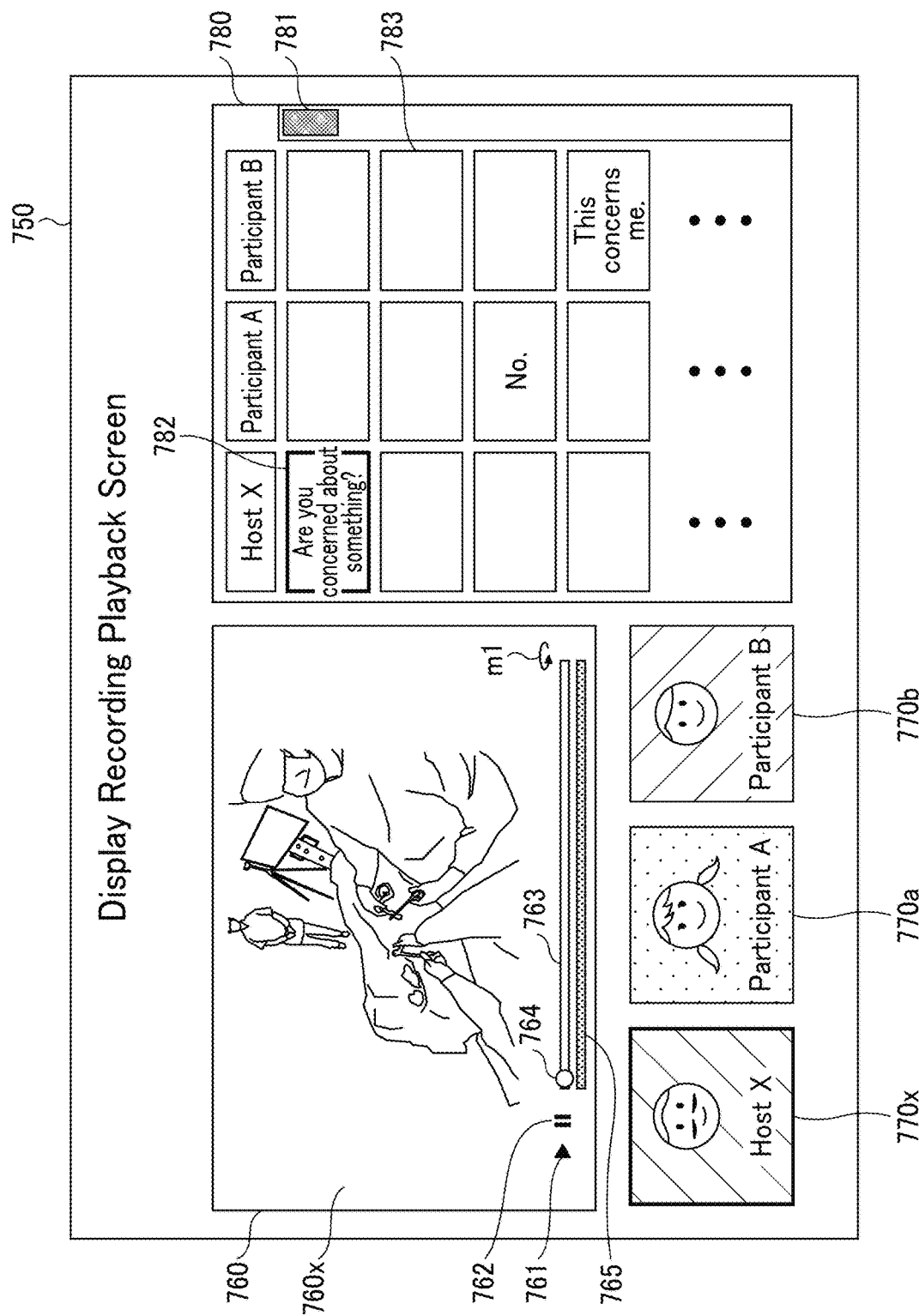

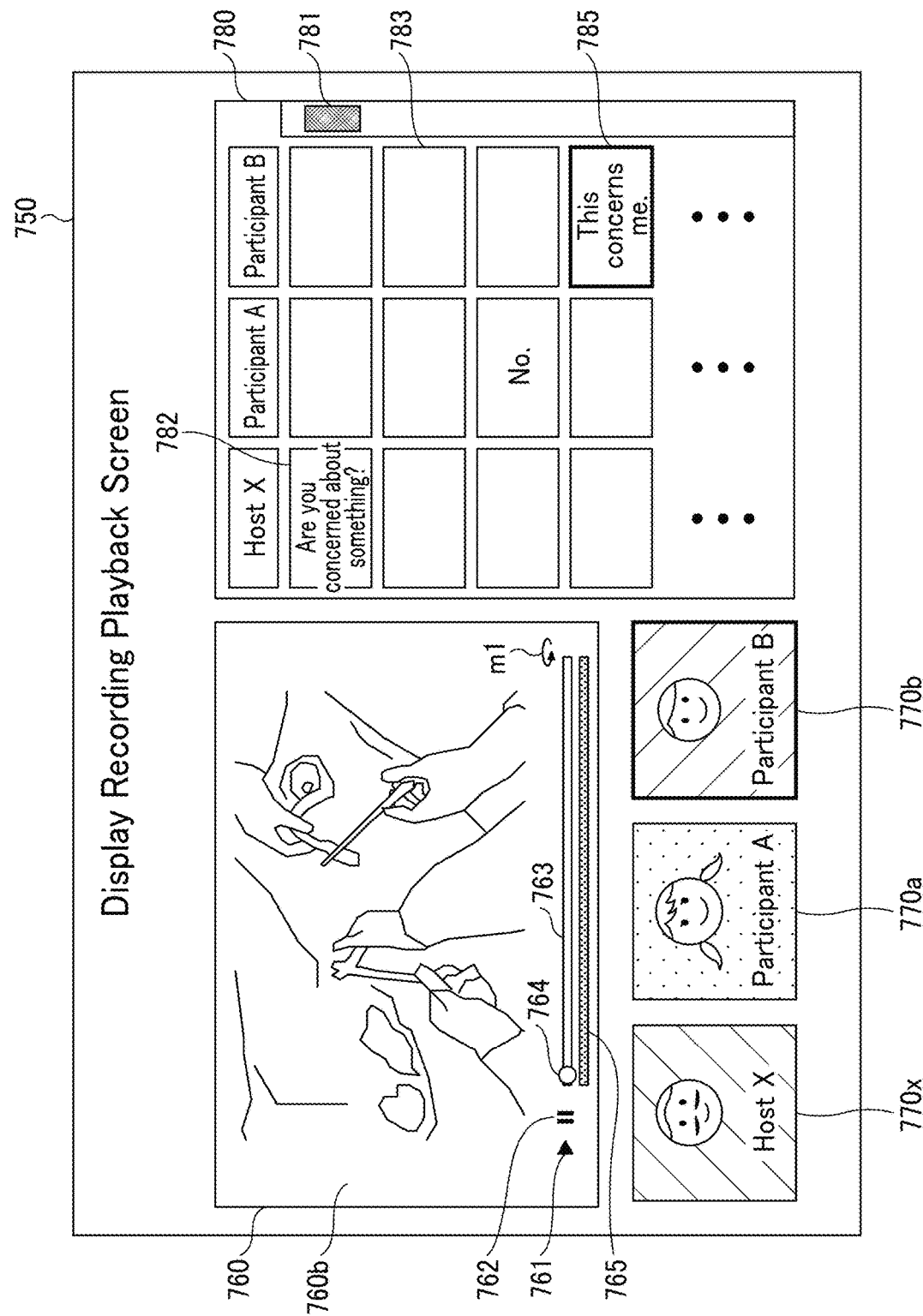

DISPLAY TERMINAL, COMMUNICATION SYSTEM, AND DISPLAY METHOD

CROSS-REFERENCE TO RELATED APPLICATIONS

This patent application is based on and claims priority pursuant to 35 U.S.C. § 119(a) to Japanese Patent Application Nos. 2023-046058, filed on Mar. 22, 2023, and 2023-218528, filed on Dec. 25, 2023, in the Japan Patent Office, the entire disclosures of which are hereby incorporated by reference herein.

BACKGROUND

Technical Field

The present disclosure relates to a display terminal, a communication system, and a display method.

Related Art

Recent image capturing apparatuses capture images in an imaging range including even an area that is difficult for a normal angle of view to cover. A known example of the images captured by such an image capturing apparatus is a wide-field-of-view image having a wide viewing angle. The wide-field-of-view image is hereinafter referred to as a "wide-view image". Examples of the wide-view image include a 360-degree image that is a captured image of an entire 360-degree view. The 360-degree image is also referred to as a spherical image, an omnidirectional image, or an "all-around" image. If the entire wide-view image is displayed by a display terminal, the wide-view image is curved and difficult for a user to view. Accordingly, each user displays a predetermined-area image indicating a desired predetermined area in the same wide-view image to view the predetermined-area image.

A technique has been proposed for automatically creating a text from a speech made by each user participating in a teleconference during the teleconference. In the technique, furthermore, the text is stored in association with materials on a shared screen during the speech made by the user, and the text and the materials are displayed later in association with each other. This technique allows a certain user to refer to a text and materials associated with the text after the teleconference ends to grasp or remember the details for the teleconference in more detail.

Unlike the materials on the shared screen described above, each individual user views a different predetermined area even in the same wide-view image. Accordingly, even in a case where a speech made by each user during recording of a moving image of the teleconference is displayed as a text during playback of the recorded moving image, it is difficult for a certain user who plays back the recorded moving image to grasp which predetermined area each of the other users was viewing in the wide-view image when making their speech during the recording of the moving image.

SUMMARY

According to an embodiment of the present disclosure, a display terminal for playing back a predetermined area of a wide-view image that is recorded includes a display and circuitry. The display displays a first display area and a second display area. The first display area being a display area related to a first recording duration in which a speech is made when a first predetermined area in the wide-view image is being displayed by a first display terminal. The second display area being a display area related to a second recording duration in which a speech is made when a second predetermined area in the wide-view image is being displayed by the first display terminal. The circuitry receives selection of the second display area during display of a first predetermined-area image indicating the first predetermined area corresponding to the first display area, and controls the display to display a second predetermined-area image indicating the second predetermined area corresponding to the second display area in response to receipt of selection of the second display area.

According to an embodiment of the present disclosure, a communication system includes a display terminal and an information management system. The display terminal plays back a predetermined area of a wide-view image that is recorded. The information management system manages information to be transmitted to the display terminal. The information management system includes circuitry that creates a first text and a second text, and transmits the first text and the second text to the display terminal. The first text is a text of a speech made in a first recording duration in which the speech is made when a first predetermined area in the wide-view image is being displayed by a first display terminal. The second text is a text of a speech made in a second recording duration in which the speech is made when a second predetermined area in the wide-view image is being displayed by a second display terminal. The display terminal includes another circuitry that receives the first text and the second text, and a display that displays a first display area and a second display area, the first display area including the first text, the second display area including the second text. The reception unit receives selection of the second display area during display of a first predetermined-area image indicating the first predetermined area corresponding to the first display area. The circuitry of the display terminal controls the display to display a second predetermined-area image indicating the second predetermined area corresponding to the second display area in response to receipt of selection of the second display area.

According to an embodiment of the present disclosure, a display method for playing back a predetermined area of a wide-view image that is recorded includes displaying a first display area and a second display area on a display, the first display area being a display area related to a first recording duration in which a speech is made when a first predetermined area in the wide-view image is being displayed by a first display terminal, the second display area being a display area related to a second recording duration in which a speech is made when a second predetermined area in the wide-view image is being displayed by the first display terminal; and receiving selection of the second display area during display of a first predetermined-area image indicating the first predetermined area corresponding to the first display area. The displaying includes displaying, on the display, a second predetermined-area image indicating the second predetermined area corresponding to the second display area in response to receipt of selection of the second display area.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4A is a conceptual diagram illustrating an example of how a Mercator image is mapped to a sphere;

FIG. 4B is a view illustrating a spherical image according to an embodiment of the present disclosure;

FIG. 5 is a view illustrating positions of a virtual camera and a predetermined area in a case where the spherical image is of a three-dimensional sphere according to an embodiment of the present disclosure;

FIG. 14 is a conceptual diagram of an example of a user/device management database (DB);

FIG. 15 is a conceptual diagram of an example of a virtual room management DB;

FIG. 16 is a conceptual diagram of an example of an angle-of-view information management DB;

FIG. 17 is a conceptual diagram of an example of a speech text management DB;

FIG. 32 is a sequence diagram illustrating a process for sharing VR content in the communication system according to an embodiment of the present disclosure;

FIG. 33 is an illustration of an example of a recording playback screen that is displayed initially according to an embodiment of the present disclosure; and FIG. 34 is an illustration of an example of the recording playback screen displayed in response to selection of a predetermined display area (a speech-duration display area or a speech-content display area).

Figure 1C:
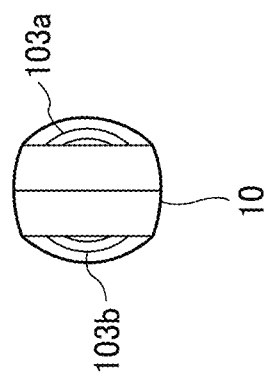
FIGS. 1A, 1, and 1C are a left side view, a front view, and a plan view of an image capturing apparatus according to an embodiment of the present disclosure, respectively.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Overview of Spherical Image

A method for generating a spherical image according to one or more embodiments will be described with reference to FIGS. 1A to 8. The spherical image is also referred to as a spherical panoramic image or a 360-degree panoramic image, and is an example of a wide-view moving image having a wide range of viewing angles. Examples of the wide-view image also include a panoramic image of about 180 degrees.

Figure 1B:
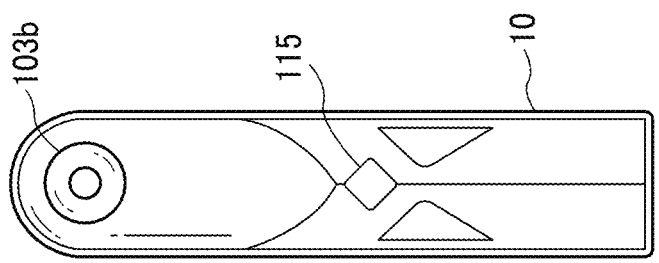
Figure 1A:
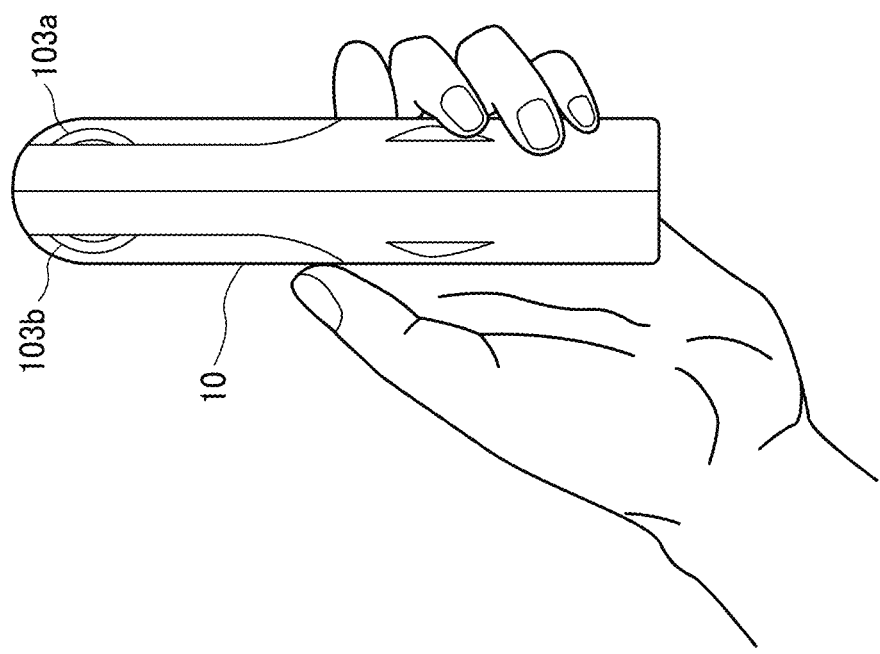

First, the external appearance of an image capturing apparatus 10 will be described with reference to FIGS. 1A to 1C. The image capturing apparatus 10 is a digital camera for capturing images from which a spherical image is generated. FIGS. 1A, 1, and 1C are a left side view, a front view, and a plan view of the image capturing apparatus 10, respectively.

As illustrated in FIG. 1A, the image capturing apparatus 10 has a size such that a person can hold the image capturing apparatus 10 with one hand. As illustrated in FIGS. 1A, 1i, and 1C, the image capturing apparatus 10 includes an imaging element 103a and an imaging element 103b in an upper portion thereof. Specifically, the imaging element 103a is disposed on the front side, and the imaging element 103b is disposed on the back side. As illustrated in FIG. 1B, the image capturing apparatus 10 further includes an operation unit 115 such as a shutter button on the back side of the image capturing apparatus 10.

Figure 2:
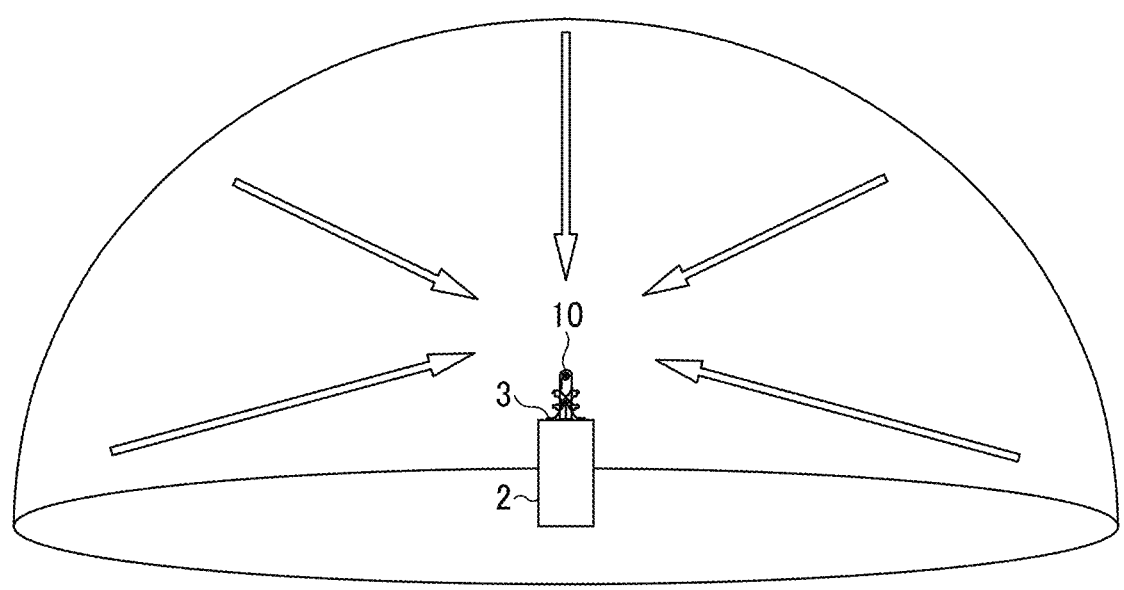
FIG. 2 is an illustration of an example of how a user uses the image capturing apparatus.

Next, a situation in which the image capturing apparatus 10 is used will be described with reference to FIG. 2. FIG. 2 is an illustration of an example of how a user uses the image capturing apparatus 10. As illustrated in FIG. 2, the image capturing apparatus 10 is communicably connected to a relay device 3 placed on a table 2. The image capturing apparatus 10 is used to capture images of surrounding objects and scenery. The imaging elements 103a and 103b illustrated in FIGS. 1A and 1C capture objects surrounding the user to obtain two hemispherical images. In one embodiment, a spherical image obtained by the image capturing apparatus 10 is not transmitted to other communication terminals or systems. In this case, the relay device 3 is omitted.

Figure 3A:
FIGS. 3A and 3B are views illustrating a hemispherical image (front side) and a hemispherical image (back side) captured by the image capturing apparatus according to an embodiment of the present disclosure, respectively.
Figure 3B:
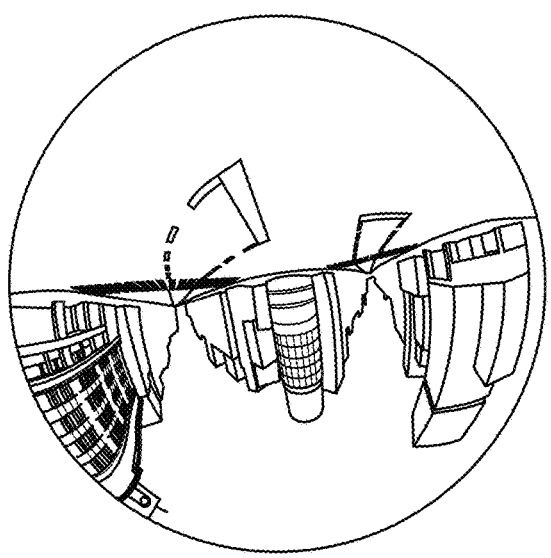
Figure 3C:
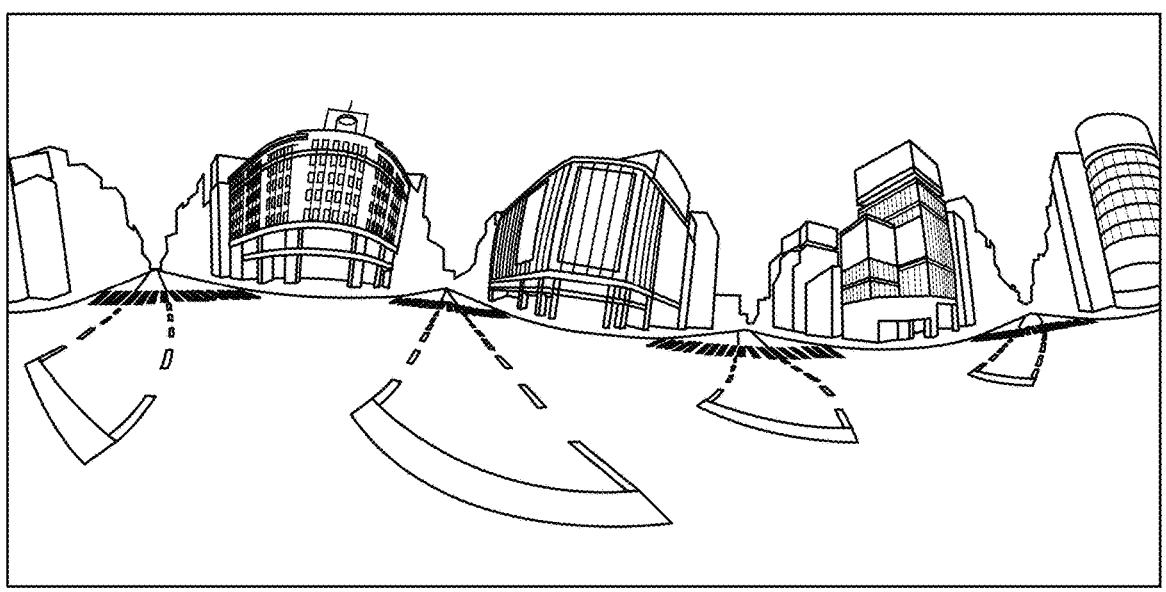
FIG. 3C is a view illustrating an example of an image represented by Mercator projection.

Next, an overview of a process for creating a spherical image from images captured by the image capturing apparatus 10 will be described with reference to FIGS. 3A to 4B. FIG. 3A illustrates a hemispherical image (front side) captured by the image capturing apparatus 10. FIG. 3B illustrates a hemispherical image (back side) captured by the image capturing apparatus 10. FIG. 3C illustrates an image in equirectangular projection, which is hereinafter referred to as an "equirectangular projection image" (or equidistant cylindrical projection image). The equirectangular projection image may be an image represented by Mercator projection. The image represented by Mercator projection is hereinafter referred to as a "Mercator image". FIG. 4A conceptually illustrates an example of how the equirectangular projection image is mapped to a sphere. FIG. 4B illustrates a spherical image. The term "equirectangular projection image" refers to a spherical image in equirectangular projection format, which is an example of the wide-view image described above.

As illustrated in FIG. 3A, an image obtained by the imaging element 103a is a curved hemispherical image (front side) captured through a wide-angle lens 102a such as a fisheye lens described below. As illustrated in FIG. 3B, an image obtained by the imaging element 103b is a curved hemispherical image (back side) captured through a wide-angle lens 102b such as a fisheye lens described below. The image capturing apparatus 10 combines the hemispherical image (front side) and the hemispherical image (back side), which are flipped 180 degrees, to generate an equirectangular projection image EC as illustrated in FIG. 3C.

The image capturing apparatus 10 uses software such as Open Graphics Library for Embedded Systems (OpenGL ES) to map the equirectangular projection image EC to a sphere so as to cover the surface of the sphere in a manner illustrated in FIG. 4A to generate a spherical image CE as illustrated in FIG. 4B. That is, the spherical image CE is represented as the equirectangular projection image EC, which corresponds to a surface facing the center of the sphere. OpenGL ES is a graphics library used for visualizing two-dimensional (2D) data and three-dimensional (3D) data. OpenGL ES is an example of software for executing image processing. Any other software may be used to create the spherical image CE. The spherical image CE may be either a still image or a moving image. In the foregoing description, as a non-limiting example, the image capturing apparatus 10 generates a spherical image. In another example, similar image processing or some steps of the image processing may be executed by a communication control system 5 or a communication terminal 7 or 9 described below.

OpenGL ES is used to attach the Mercator image to a sphere in such a manner as to cover the surface of the sphere in a manner as illustrated in FIG. 4A. As a result, as illustrated in FIG. 4B, a spherical image is generated. That is, the spherical image is represented as the Mercator image, which corresponds to a surface facing the center of the sphere. OpenGL ES is a graphics library used for visualizing 2D data and 3D data.

As described above, since the spherical image CE is an image mapped to a sphere in such a manner as to cover the surface of the sphere, part of the image may look distorted when viewed by a user, providing a strange feeling. Accordingly, an image of a predetermined area that is part of the spherical image CE is displayed as a less distorted planar image having fewer curves on the communication terminal 7 or 9 to make the user feel comfortable. The image of the predetermined area is hereinafter referred to as a "predetermined-area image". The display of the predetermined-area image will be described with reference to FIGS. 5 to 8.

Figure 6A:
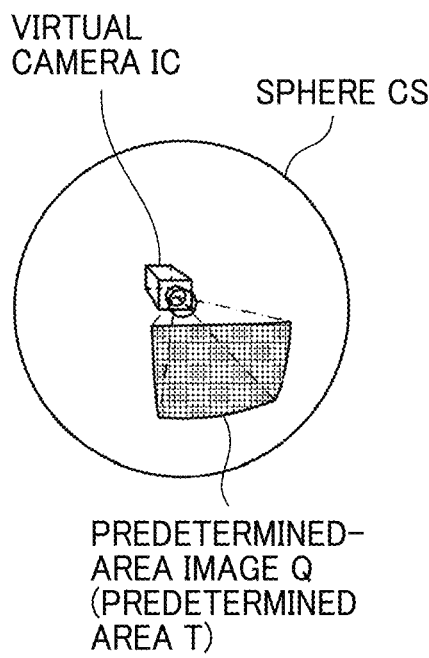
FIG. 6A is a perspective view of the virtual camera and the predetermined area illustrated in FIG. 5 according to an embodiment of the present disclosure.
Figure 6B:
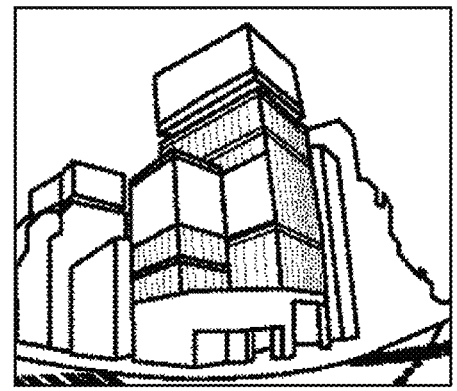
FIG. 6B is a view illustrating a predetermined-area image obtained in the state illustrated in FIG. 6A and displayed on a display according to an embodiment of the present disclosure.
Figure 6C:
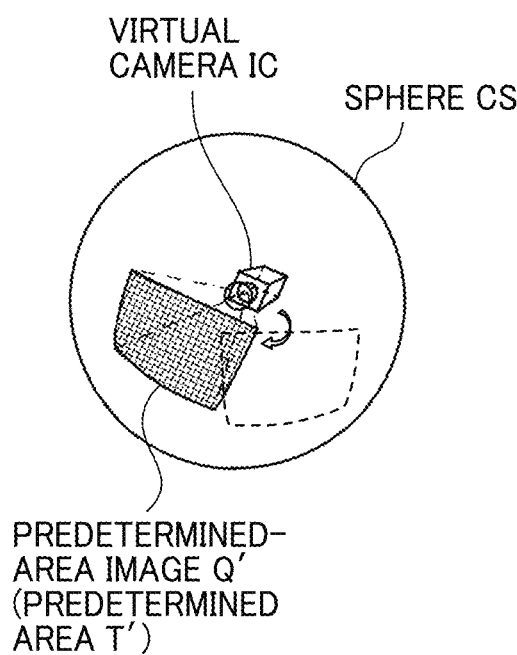
FIG. 6C is a view of a predetermined area obtained by changing the point of view of the virtual camera illustrated in FIG. 6A according to an embodiment of the present disclosure.
Figure 6D:
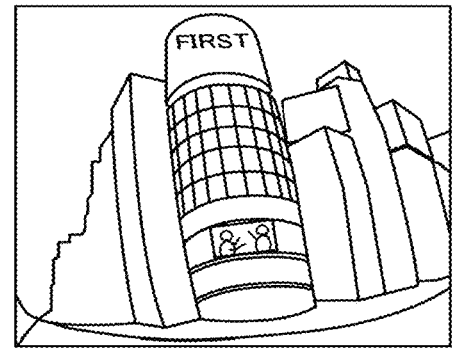
FIG. 6D is a view illustrating a predetermined-area image obtained in the state illustrated in FIG. 6C and displayed on the display according to an embodiment of the present disclosure.

FIG. 5 is a view illustrating the position of a virtual camera IC and the position of a predetermined area T in a case where the spherical image CE is of a three-dimensional sphere CS. The position of the virtual camera IC corresponds to the position of a virtual point of view of a user who is viewing the spherical image CE represented as a surface area of the three-dimensional sphere CS. FIG. 6A is a perspective view of the virtual camera IC and the predetermined area T illustrated in FIG. 5. FIG. 6B illustrates a predetermined-area image obtained in the state illustrated in FIG. 6A and displayed on a display. FIG. 6C illustrates a predetermined area obtained by changing the point of view of the virtual camera IC illustrated in FIG. 6A. FIG. 6D illustrates a predetermined-area image obtained in the state illustrated in FIG. 6C and displayed on the display.

Assuming that the spherical image CE generated in the way described above is a surface area of the sphere CS, as illustrated in FIG. 5, the virtual camera IC is located inside the spherical image CE. The predetermined area T in the spherical image CE is an imaging area of the virtual camera IC. Specifically, the predetermined area T is specified by angle-of-view information indicating an imaging direction and an angle of view of the virtual camera IC in a three-dimensional virtual space including the spherical image CE. The angle-of-view information is also referred to as "area information".

In one embodiment, zooming in or out of the predetermined area T is implemented by bringing the virtual camera IC closer to or farther away from the spherical image CE. A predetermined-area image Q is an image of the predetermined area T in the spherical image CE. The predetermined area T is defined by an angle of view a and a distance f from the virtual camera IC to the spherical image CE.

In response to the shift (also referred to as "change") of the point of view of the virtual camera IC to the right (i.e., to the left from the viewer's perspective) from the state illustrated in FIG. 6A, as illustrated in FIG. 6C, the predetermined area T in the spherical image CE is shifted to a predetermined area T'. Accordingly, the predetermined-area image Q displayed on a predetermined display is changed to a predetermined-area image Q'. As a result, the image displayed on the predetermined display changes from the image illustrated in FIG. 6B to the image illustrated in FIG. 6D.

Figure 7:
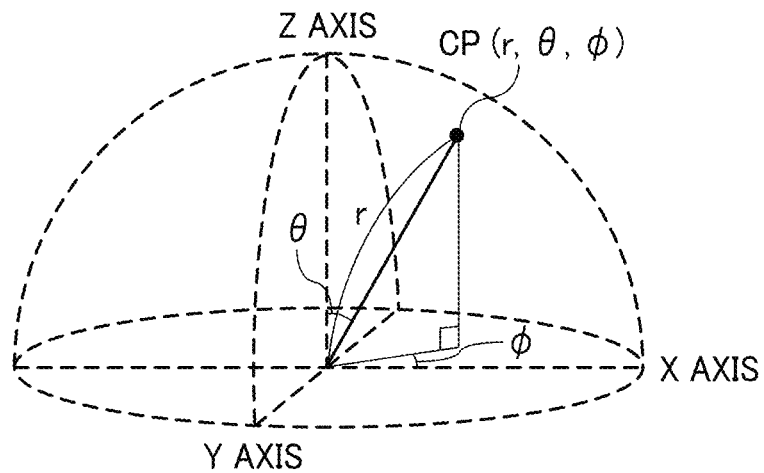
FIG. 7 is a view illustrating a point in a three-dimensional Euclidean space defined in spherical coordinates according to an embodiment of the present disclosure.
Figure 8:
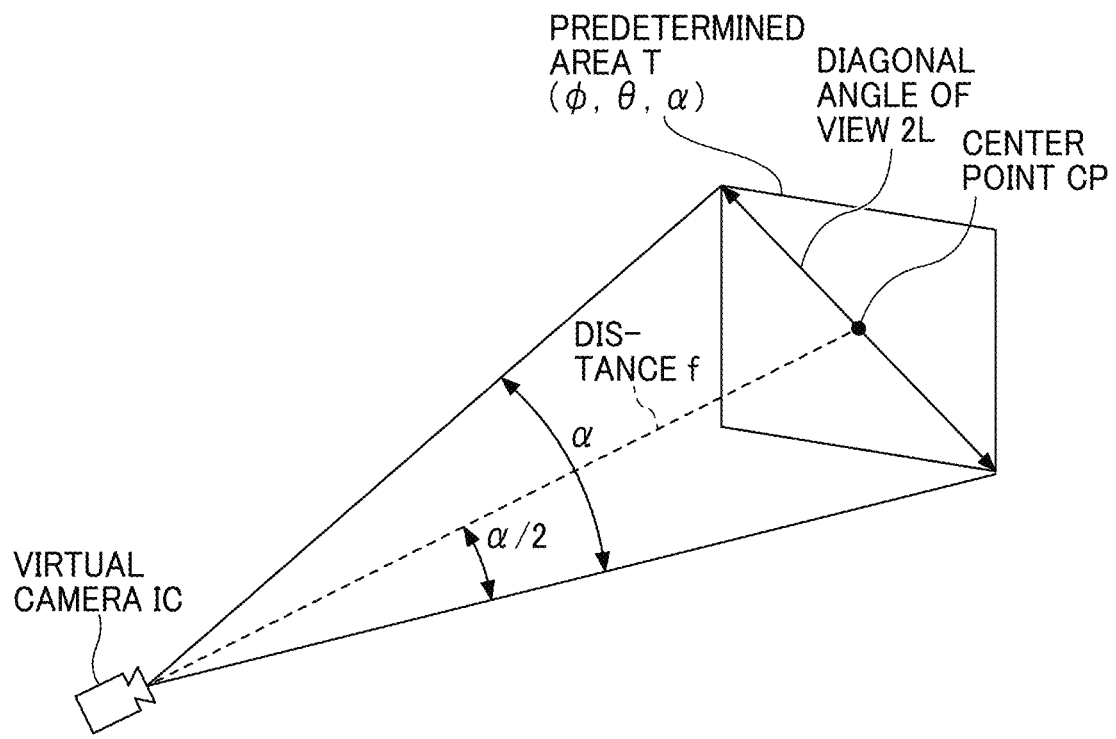
FIG. 8 is a conceptual diagram illustrating a relationship between the predetermined area and a point of interest according to an embodiment of the present disclosure.

The relationship between the angle-of-view information and the image of the predetermined area T will be described with reference to FIGS. 7 and 8. FIG. 7 illustrates a point in a three-dimensional Euclidean space defined in spherical coordinates. FIG. 8 conceptually illustrates a relationship between the predetermined area T and a point of interest (center point CP).

In FIG. 7, the center point CP is represented by a spherical polar coordinate system to obtain position coordinates $(r, \theta, \varphi)$. The position coordinates $(r, \theta, \varphi)$ represent a radius vector, a polar angle, and an azimuth angle, respectively. The radius vector r is a distance from the origin of the three-dimensional virtual space including the spherical image CE to any point (in FIG. 8, the center point CP). Accordingly, the radius vector r is equal to a distance f illustrated in FIG. 8.

As illustrated in FIG. 8, when the center of the predetermined area T, which is the imaging area of the virtual camera IC, is considered as the center point CP illustrated in FIG. 7, a trigonometric function equation typically expressed by Equation (1) below is satisfied.

$$(L/f)=\tan(\alpha/2) \quad (1)$$

In Equation (1), f denotes the distance from the virtual camera IC to the center point CP. Further, L denotes the distance between the center point CP and a given vertex of the predetermined area T (2L is a diagonal line), and a denotes the angle of view. In this case, the angle-of-view information for specifying the predetermined area T may be represented by pan ($\theta$), tilt ($\varphi$), and field of view (fov) ($\alpha$) values. Zooming in or out the predetermined area T may be determined by increasing or decreasing the range (arc) of the angle of view a.

First Embodiment

Overview of Communication System

Figure 9:
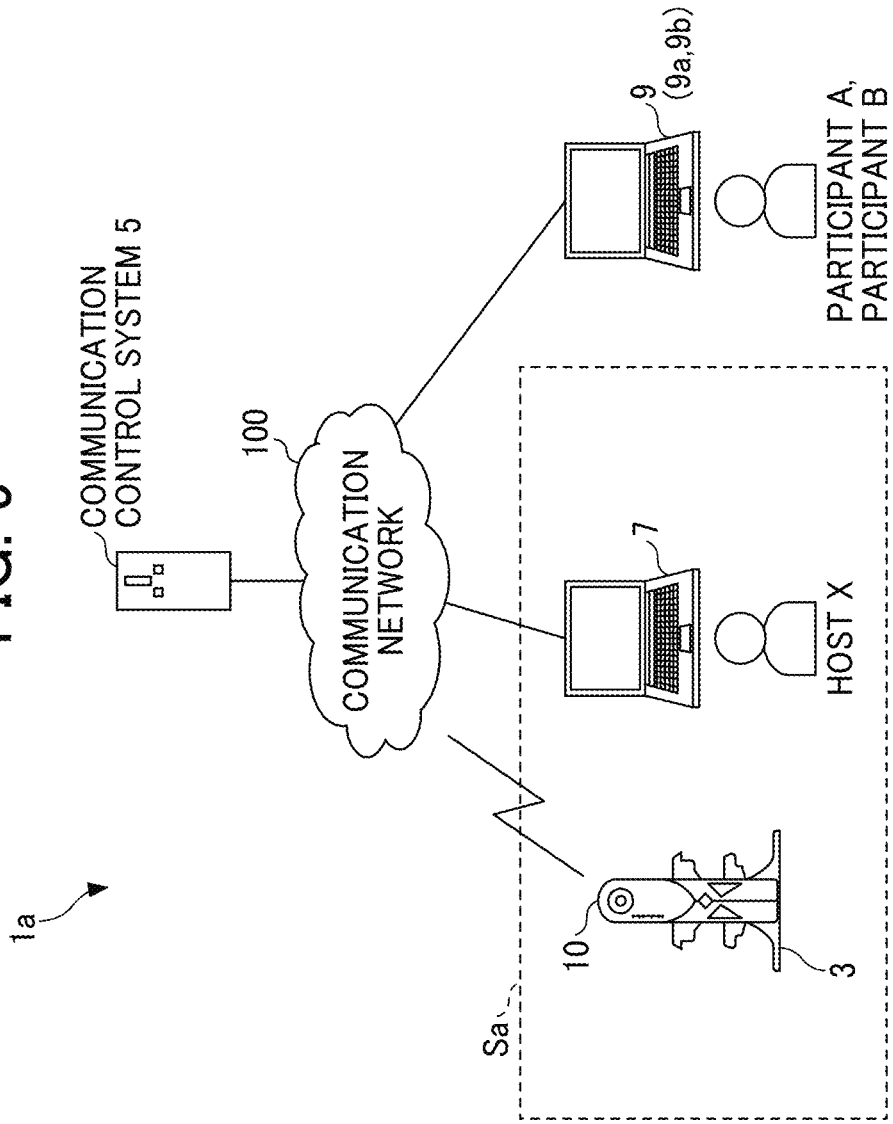
FIG. 9 is a schematic diagram of a communication system according to a first embodiment of the present disclosure.

An overview of a communication system 1a according to a first embodiment will be described with reference to FIG. 9. FIG. 9 is a schematic diagram of the communication system 1a according to the first embodiment.

As illustrated in FIG. 9, the communication system 1a according to this embodiment includes an image capturing apparatus 10, a relay device 3, a communication terminal 7, and communication terminals 9a and 9b. The communication terminals 9a and 9b are individually referred to as a "communication terminal 9" or collectively referred to as "communication terminals 9". Each communication terminal may be referred to as a "display terminal" for displaying an image or the like.

As described above, the image capturing apparatus 10 is a digital camera for capturing a wide-view image (such as a spherical image). The relay device 3 has a function of a cradle for charging the image capturing apparatus 10 and transmitting and receiving data to and from the image capturing apparatus 10. In one embodiment, the relay device 3 performs data communication with the image capturing apparatus 10 via a contact and also performs data communication with the communication control system 5 via a communication network 100. Examples of the communication network 100 include the Internet, a local area network (LAN), and a (wireless) router.

In one embodiment, the communication control system 5 is a computer and performs data communication with the relay device 3 and the communication terminals 7 and 9 via the communication network 100. Since the communication control system 5 manages angle-of-view information and the like, the communication control system 5 may also be referred to as an "information management system".

In one embodiment, the communication terminals 7 and 9 are laptop personal computers (PCs) and perform data communication with the communication control system 5 via the communication network 100. Each of the communication terminals 7 and 9 is installed with OpenGL ES and generates a predetermined-area image (see FIGS. 6A to 6D) from a spherical image received from the communication control system 5. The communication control system 5 may be implemented by a single server computer or may be implemented by multiple server computers.

The image capturing apparatus 10 and the relay device 3 are placed at predetermined positions by a host X or the like in a site Sa such as a construction site, an exhibition site, an education site, or a medical site. The communication terminal 7 is operated by the host X. The communication terminal 9a is operated by a participant A such as a viewer at a remote location from the site Sa. The communication terminal 9b is operated by a participant B such as a viewer at a remote location from the site Sa. The participants A and B may be located in the same location or different locations.

The communication control system 5 transmits (distributes) a wide-view image obtained from the image capturing apparatus 10 via the relay device 3 to the communication terminals 7 and 9. Further, the communication control system 5 receives, from each of the communication terminals 7 and 9, angle-of-view information for specifying a predetermined area in a predetermined-area image currently displayed on the corresponding one of the communication terminals 7 and 9 and transmits the angle-of-view information to the communication terminal 7 and 9. The wide-view image may be either a moving image (wide-view moving image) or a still image (wide-view still image).

Hardware Configurations in First Embodiment

Next, the hardware configurations of the image capturing apparatus 10, the relay device 3, and the communication terminals 7 and 9 according to this embodiment will be described in detail with reference to FIGS. 10 to 12.

Hardware Configuration of Image Capturing Apparatus

Figure 10:
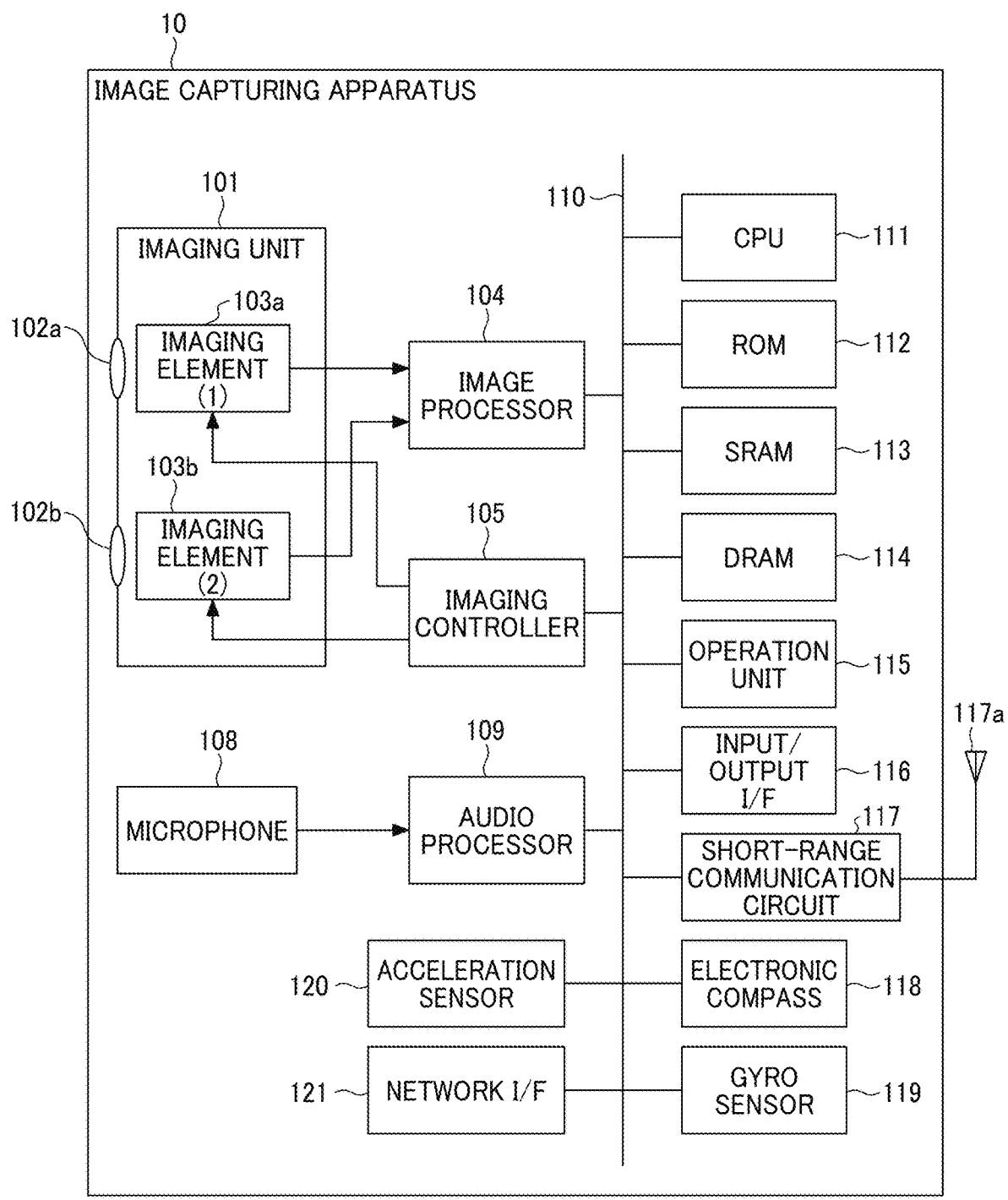
FIG. 10 is a block diagram illustrating an example hardware configuration of the image capturing apparatus.

FIG. 10 is a diagram illustrating an example hardware configuration of the image capturing apparatus 10. As illustrated in FIG. 10, the image capturing apparatus 10 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, an operation unit 115, an input/output interface (I/F) 116, a short-range communication circuit 117, an antenna 117a for the short-range communication circuit 117, an electronic compass 118, a gyro sensor 119, an acceleration sensor 120, and a network I/F 121.

The imaging unit 101 includes two wide-angle lenses (so-called fish-eye lenses) 102a and 102b (collectively referred to as lens 102 unless distinguished), each having an angle of view of equal to or greater than 180 degrees so as to form a hemispherical image. The imaging unit 101 further includes two imaging elements 103a and 103b corresponding to the lenses 102a and 102b respectively.

Each of the imaging elements 103a and 103b includes an image sensor such as a complementary metal oxide semiconductor (CMOS) sensor or a charge-coupled device (CCD) sensor, a timing generation circuit, and a group of registers. The image sensor converts an optical image formed by the lens 102a or 102b into an electric signal and outputs image data. The timing generation circuit generates horizontal or vertical synchronization signals, pixel clocks, and the like for the image sensor. In the group of registers, various commands, parameters, and the like for an operation of the imaging element 103a or 103b are set. As a non-limiting example, the imaging unit 101 includes two wide-angle lenses. The imaging unit 101 may include one wide-angle lens or three or more wide-angle lenses.

Each of the imaging elements 103a and 103b of the imaging unit 101 is connected to the image processor 104 via a parallel I/F bus. Further, each of the imaging elements 103a and 103b of the imaging unit 101 is connected to the imaging controller 105 via a serial I/F bus such as an inter-integrated circuit (I2C) bus.

The image processor 104, the imaging controller 105, and the audio processor 109 are connected to the CPU 111 via a bus 110. The ROM 112, the SRAM 113, the DRAM 114, the operation unit 115, the input/output I/F 116, the short-range communication circuit 117, the electronic compass 118, the gyro sensor 119, the acceleration sensor 120, and the network I/F 121 are also connected to the bus 110.

The image processor 104 acquires respective items of image data output from the imaging elements 103a and 103b via the parallel I/F buses and performs predetermined processing on the items of image data. Thereafter, the image processor 104 combines the items of image data to generate data of an equirectangular projection image (an example of a wide-view image) described below.

The imaging controller 105 usually functions as a master device while each of the imaging elements 103a and 103b usually functions as a slave device. The imaging controller 105 sets commands and the like in the group of registers of each of the imaging elements 103a and 103b via the I2C bus. The imaging controller 105 receives various commands from the CPU 111. The imaging controller 105 further acquires status data and the like of the group of registers of each of the imaging elements 103a and 103b via the I2C bus. The imaging controller 105 sends the obtained status data and the like to the CPU 111.

The imaging controller 105 instructs the imaging elements 103a and 103b to output the image data at the time when a shutter button of the operation unit 115 is pressed. In one example, the image capturing apparatus 10 displays a preview image or a moving image (movie) on a display. Examples of the display include a display of a smartphone or any other external terminal that performs short-range communication with the image capturing apparatus 10 through the short-range communication circuit 117. In the case of displaying movie, image data are continuously output from the imaging elements 103a and 103b at a predetermined frame rate (expressed in frames per minute).

As described below, the imaging controller 105 operates in cooperation with the CPU 111 to synchronize the time when the imaging element 103a outputs image data and the time when the imaging element 103b outputs the image data. In this embodiment, the image capturing apparatus 10 does not include a display unit (or display). In some embodiments, the image capturing apparatus 10 may include a display unit. The microphone 108 converts sound to audio data (signal).

The audio processor 109 acquires the audio data output from the microphone 108 via an I/F bus and performs predetermined processing on the audio data.

The CPU 111 controls entire operation of the image capturing apparatus 10 and performs predetermined processing.

The ROM 112 stores various programs for execution by the CPU 111. Each of the SRAM 113 and the DRAM 114 operates as a work memory to store programs to be executed by the CPU 111 or data being currently processed. More specifically, in one example, the DRAM 114 stores image data currently processed by the image processor 104 and data of the equirectangular projection image on which processing has been performed.

The operation unit 115 collectively refers to various operation buttons such as a shutter button, a power switch, a touch panel having both the display and operation functions, and the like. The user operates the operation unit 115 to input various image capturing modes or image capturing conditions.

The input/output I/F 116 collectively refers to an interface circuit such as a universal serial bus (USB) I/F that allows the image capturing apparatus 10 to communicate with an external medium such as a Secure Digital (SD) card or an external personal computer. The input/output I/F 116 may be either wired or wireless. The data of the equirectangular projection image, which is stored in the DRAM 114, is stored in the external medium via the input/output I/F 116 or transmitted to an external terminal (apparatus) via the input/output I/F 116, as desired.

The short-range communication circuit 117 communicates with the external terminal (apparatus) via the antenna 117a of the image capturing apparatus 10 by short-range wireless communication technology such as near field communication (NFC), Bluetooth®, or Wi-Fi®. The short-range communication circuit 117 can transmit the data of the equirectangular projection image to the external terminal (apparatus).

The electronic compass 118 calculates an orientation of the image capturing apparatus 10 from the Earth's magnetism and outputs orientation information. The orientation information is an example of related information (metadata) in compliance with exchangeable image file format (Exif). The orientation information is used for image processing such as image correction of a captured image. The related information also includes data of a date and time when the image was captured, and data of a data size of image data.

The gyro sensor 119 detects a change in tilt (roll, pitch, and yaw) of the image capturing apparatus 10 with movement of the image capturing apparatus 10. The change in tilt is one example of related information (metadata) in compliance with Exif. This information is used for image processing such as image correction of a captured image.

The acceleration sensor 120 detects acceleration in three axial directions.

In the image capturing apparatus 10, the position (an angle with respect to the direction of gravity) of the image capturing apparatus 10 is calculated by using the electronic compass 118 and the acceleration sensor 120. The acceleration sensor 120 of the image capturing apparatus 10 improves the accuracy of image correction.

The network I/F 121 is an interface for performing data communication using the communication network 100, such as the Internet, via a router or the like. The hardware elements of the image capturing apparatus 10 are not limited to the illustrated ones as long as the functional configuration of the image capturing apparatus 10 can be implemented. At least some of the hardware elements described above may reside on the relay device 3 or the communication network 100.

Hardware Configuration of Relay Device

Figure 11:
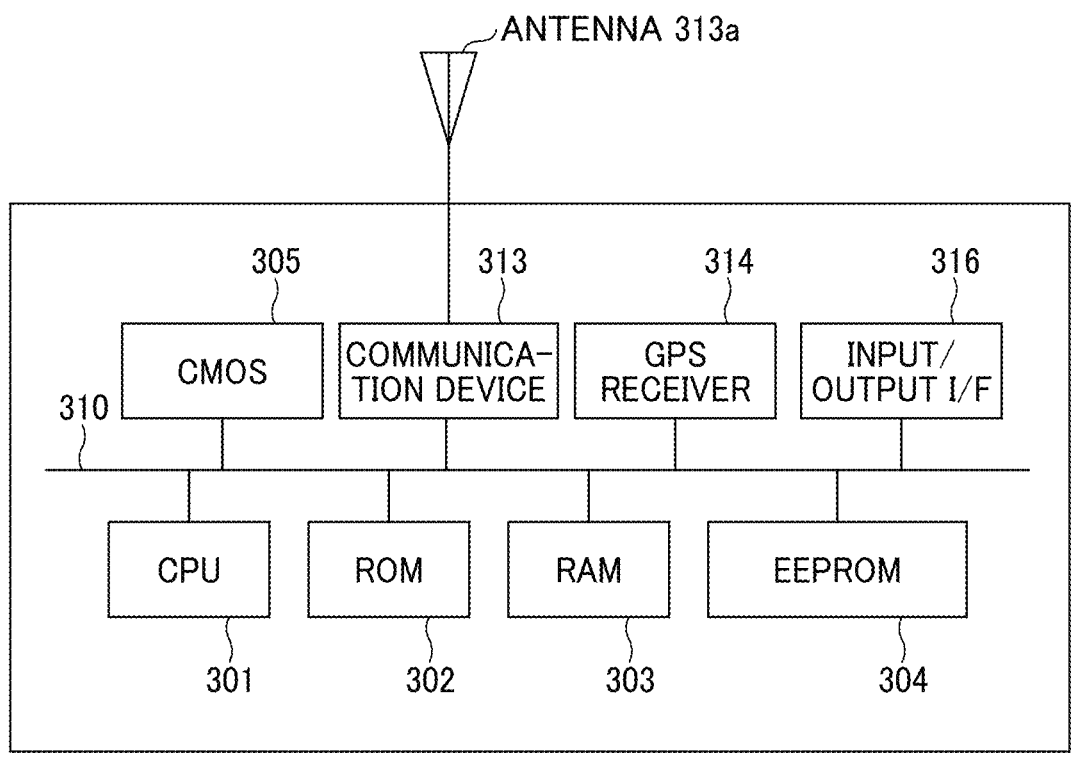
FIG. 11 is a block diagram illustrating an example hardware configuration of a relay device.

FIG. 11 is a block diagram illustrating an example hardware configuration of the relay device 3. In FIG. 11, the relay device 3 is a cradle having a wireless communication function.

As illustrated in FIG. 11, the relay device 3 includes a CPU 301, a ROM 302, a RAM 303, an electrically erasable programmable ROM (EEPROM) 304, a CMOS sensor 305, a bus line 310, a communication unit 313, an antenna 313a, a Global Positioning System (GPS) receiving unit 314, and an input/output I/F 316.

The CPU 301 controls entire operation of the relay device 3. The ROM 302 stores an initial program loader (IPL) or any other program used for booting the CPU 301. The RAM 303 is used as a work area for the CPU 301.

The EEPROM 304 reads and writes data under the control of the CPU 301. The EEPROM 304 stores an operating system (OS) to be executed by the CPU 301, other programs, and various types of data.

The CMOS sensor 305 is a solid-state imaging element that captures an image of an object under the control of the CPU 301 to obtain image data.

The communication unit 313 performs communication with the communication network 100 through the antenna 313a by using a wireless communication signal.

The GPS receiving unit 314 receives a GPS signal including location information (latitude, longitude, and altitude) of the relay device 3 via a GPS satellite or an indoor messaging system (IMES) serving as an indoor GPS.

The input/output I/F 316 is an interface circuit (such as a USB I/F) electrically connected to the input/output I/F 116 of the image capturing apparatus 10. The input/output I/F 316 may be either wired or wireless.

The bus line 310 is an address bus, a data bus, or the like for electrically connecting the components such as the CPU 301 to each other.

Figure 12:
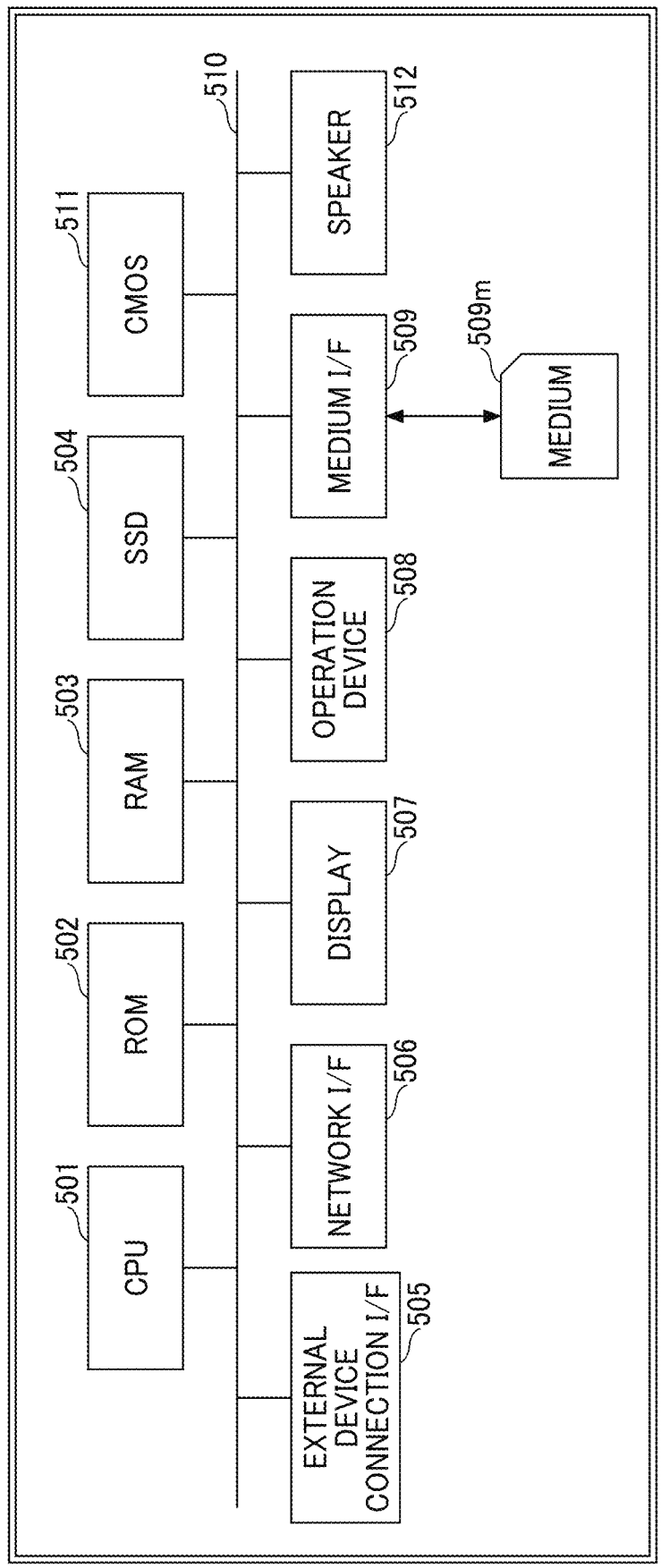
FIG. 12 is a block diagram illustrating an example hardware configuration of a communication control system and a communication terminal.

Hardware Configuration of Communication Control System and Communication Terminals FIG. 12 is a block diagram illustrating an example hardware configuration of the communication control system 5. The hardware configuration of the communication terminals 7 and 9 is similar to that of the communication control system 5, and the description thereof will be omitted.

As illustrated in FIG. 12, the communication control system 5 is a computer including a CPU 501, a ROM 502, a RAM 503, a solid state drive (SSD) 504, an external device connection I/F 505, a network I/F 506, a display 507, an operation unit 508, a medium I/F 509, a bus line 510, a CMOS sensor 511, and a speaker 512.

The CPU 501 controls entire operation of the communication control system 5. The ROM 502 stores an IPL or any other program used for booting the CPU 501. The RAM 503 is used as a work area for the CPU 501.

The SSD 504 reads or writes various types of data under the control of the CPU 501. In one embodiment, each of the communication terminals 7 and 9 does not include the SSD 504 when the communication terminals 7 and 9 are smartphones or the like. In one embodiment, the communication control system 5 includes a hard disk drive (HDD) in place of the SSD 504. The same applies to the communication terminals 7 and 9.

The external device connection I/F 505 is an interface for connecting the communication control system 5 to various external devices. The external devices include, but are not limited to, a display, a speaker, a keyboard, a mouse, a USB memory, and a printer.

The network I/F 506 is an interface for performing data communication via the communication network 100.

The display 507 is a type of display device such as a liquid crystal display or an organic electroluminescent (EL) display that displays various images.

The operation unit 508 is an input means operated by a user to select or execute various instructions, select a target for processing, or move a cursor being displayed. Examples of the input means include various operation buttons, a power switch, a shutter button, and a touch panel.

The medium I/F 509 controls reading or writing (storing) of data from or to a recording medium 509m such as a flash memory. Examples of the recording medium 509m include a digital versatile disc (DVD) and a Blu-ray Disc®.

The CMOS sensor 511 is a type of imaging means for capturing an image of an object under the control of the CPU 501 to obtain image data. The communication control system 5 may include a CCD sensor in place of the CMOS sensor 511.

The speaker 512 is a circuit that converts an electric signal into physical vibration to generate sound such as music or voice.

The bus line 510 is an address bus, a data bus, or the like for electrically connecting the components such as the CPU 501 to each other.

Functional Configurations in First Embodiment

Next, functional configurations in the first embodiment will be described with reference to FIGS. 13 to 16.

Functional Configuration of Image Capturing Apparatus

Figure 13:
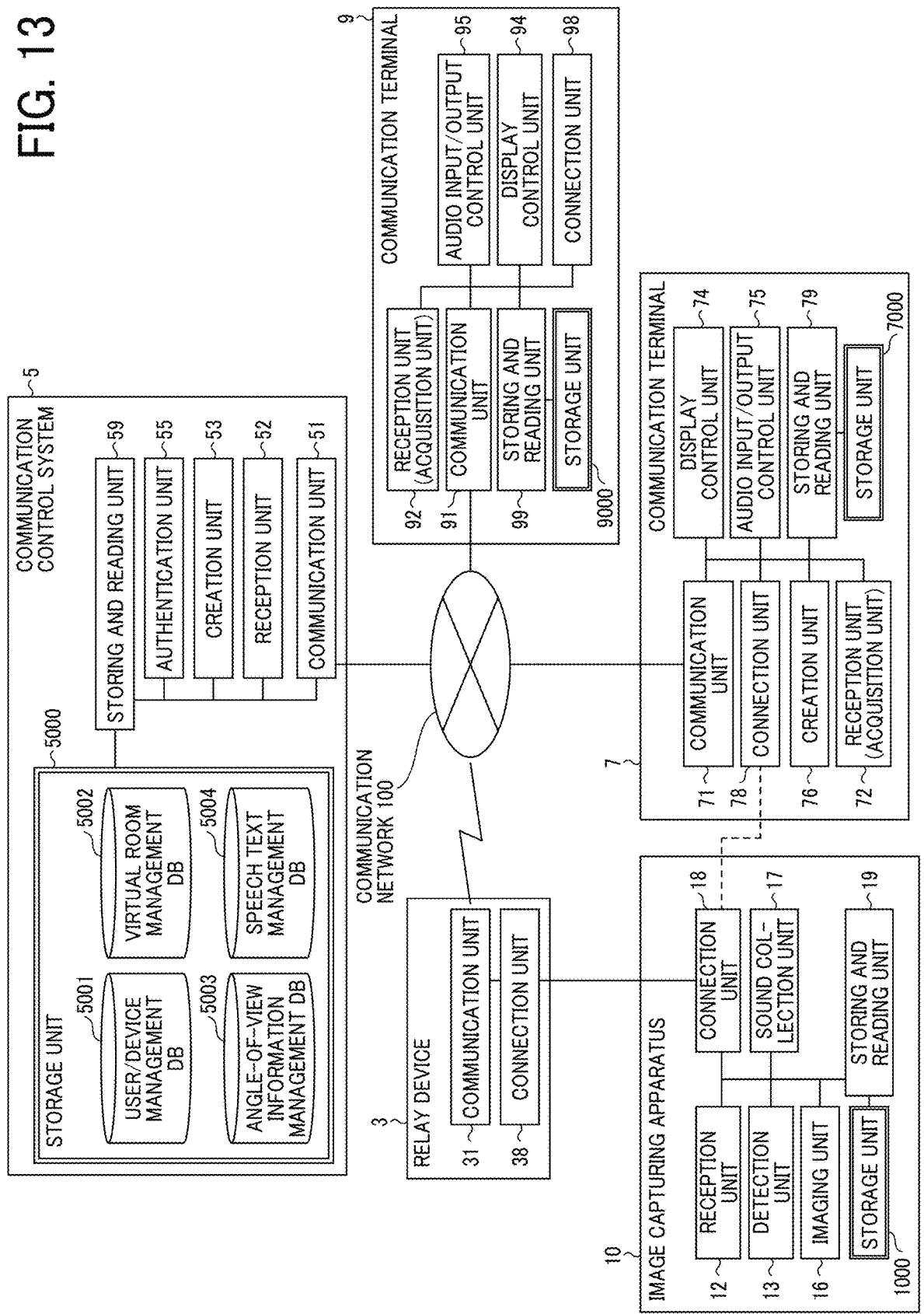
FIG. 13 is a block diagram illustrating an example functional configuration of the communication system according to the first embodiment.

As illustrated in FIG. 13, the image capturing apparatus 10 includes a reception unit 12, a detection unit 13, an imaging unit 16, a sound collection unit 17, a connection unit 18, and a storing and reading unit 19. The components of the image capturing apparatus 10 are functions or means implemented by any one of the hardware elements illustrated in FIG. 10 operating in accordance with instructions from the CPU 111 according to a program for the image capturing apparatus 10 loaded onto the DRAM 114 from the SRAM 113.

The image capturing apparatus 10 further includes a storage unit 1000. The storage unit 1000 is implemented by the ROM 112, the SRAM 113, and the DRAM 114 illustrated in FIG. 10.

Functional Configuration of Image Capturing Apparatus

The reception unit 12 of the image capturing apparatus 10 is mainly implemented by the operation unit 115 operating in accordance with instructions from the CPU 111. The reception unit 12 receives an operation input from the user.

The detection unit 13 is mainly implemented by the electronic compass 118, the gyro sensor 119, and the acceleration sensor 120 operating in accordance with instructions from the CPU 111. The detection unit 13 detects the position of the image capturing apparatus 10 to obtain position information.

The imaging unit 16 is mainly implemented by the imaging unit 101, the image processor 104, and the imaging controller 105 operating in accordance with instructions from the CPU 111. The imaging unit 16 obtains a captured image of scenery and objects.

The sound collection unit 17 is mainly implemented by the audio processor 109 operating in accordance with instructions from the CPU 111. The sound collection unit 17 picks up sounds around the image capturing apparatus 10.

The connection unit 18 is mainly implemented by the input/output I/F 116 operating in accordance with instructions from the CPU 111. The connection unit 18 performs data communication with the relay device 3.

The storing and reading unit 19 is implemented by operation of the CPU 111. The storing and reading unit 19 stores various types of data (or information) in the storage unit 1000 or reads various types of data (or information) from the storage unit 1000.

Functional Configuration of Relay Device

As illustrated in FIG. 13, the relay device 3 includes a communication unit 31 and a connection unit 38. The components of the relay device 3 are functions or means implemented by any one of the hardware elements illustrated in FIG. 11 operating in accordance with instructions from the CPU 301 according to a program for the relay device 3 loaded onto the RAM 303 from the EEPROM 304.

Functional Configuration of Relay Device

The communication unit 31 of the relay device 3 is mainly implemented by the communication unit 313 operating in accordance with instructions from the CPU 301 illustrated in FIG. 11. The communication unit 31 performs data communication with the image capturing apparatus 10 and the communication control system 5 via the communication network 100.

The connection unit 38 is mainly implemented by the input/output I/F 316 operating in accordance with instructions from the CPU 301. The connection unit 38 performs data communication with the image capturing apparatus 10.

Functional Configuration of Communication Control System

Referring to FIG. 13, the functional configuration of the communication control system 5 will be described in detail. The communication control system 5 includes a communication unit 51, a reception unit 52, a creation unit 53, an authentication unit 55, and a storing and reading unit 59. The components of the communication control system 5 are functions or means implemented by any one of the hardware elements illustrated in FIG. 12 operating in accordance with instructions from the CPU 501 according to a program for the communication control system 5 loaded onto the RAM 503 from the SSD 504.

The communication control system 5 further includes a storage unit 5000. The storage unit 5000 is implemented by the RAM 503 and the SSD 504 illustrated in FIG. 12. The storage unit 5000 includes a user/device management database (DB) 5001, a virtual room management DB 5002, an angle-of-view information management DB 5003, and a speech text management DB 5004.

User/Device Management DB

FIG. 14 conceptually illustrates an example of the user/device management DB 5001. The user/device management DB 5001 is configured in a table format. In the user/device management DB 5001, a user ID (or device ID), a password, a name, a user image, and an Internet protocol (IP) address are stored in association with each other for management.

The user ID is an example of user identification information for identifying a user (e.g., the host X, the participant A, or the participant B). The device ID is an example of device identification information for identifying a device such as the image capturing apparatus 10. In one embodiment, a head-mounted display or the like other than the image capturing apparatus 10 is used. In this case, the head-mounted display or the like is also identified as a device.

The name is the name of the user or device.

The user image is registered in advance by the user. Examples of the user image include a schematic image of the face of the user and a photograph of the face of the user.

The IP address is an example of information for specifying the address of a device such as the image capturing apparatus 10 or the communication terminal 7 or 9 used by the user.

Virtual Room Management DB

FIG. 15 conceptually illustrates an example of the virtual room management DB 5002. The virtual room management DB 5002 is configured in a table format. In the virtual room management DB 5002, a virtual room ID, a virtual room name, a device ID, a host ID, a participant ID, a content ID, a content uniform resource locator (URL), and an angle-of-view information URL are stored in association with each other for management. The content URL is storage location information of content data of an image and audio. The angle-of-view information URL is storage location information of the angle-of-view information management DB 5003.

The virtual room ID is an example of virtual room identification information for identifying a virtual room.

The virtual room name is the name of the virtual room and is given by the user or the like.

The device ID is synonymous with the device ID illustrated in FIG. 14 and is the ID of a device participating in the virtual room indicated by the virtual room ID in the same record.

The host ID is the ID of a host participating in the virtual room indicated by the virtual room ID in the same record and is an example of host identification information for identifying the host among users indicated by user IDs illustrated in FIG. 14.

The participant ID is the ID of a participant participating in the virtual room indicated by the virtual room ID in the same record and is an example of participant identification information for identifying the participant among the users indicated by the user IDs illustrated in FIG. 14.

The content ID is an example of content identification information for identifying content data of an image and audio. The image is a wide-view image that has been captured, and the audio is a sound (including a voice) obtained during capture of the wide-view image.

The content URL is an example of content storage location information indicating a location where content (wide-view image and audio information) data is stored. The content URL stores the content data and the time at which the content (i.e., the wide-view image and the audio) was recorded in association with each other.

The angle-of-view information URL is an example of angle-of-view storage location information indicating a location where the angle-of-view information management DB 5003 illustrated in FIG. 16 is stored.

Angle-of-View Information Management DB

FIG. 16 conceptually illustrates an example of the angle-of-view information management DB 5003. The angle-ofview information management DB 5003 is configured in a table format. In the angle-of-view information management DB 5003, a user ID, an IP address, angle-of-view information (pan, tilt, and fov), and a time stamp (or elapsed playback time) are stored for each content ID in association with each other for management. The time stamp may also be referred to as an elapsed recording time.

The user ID is synonymous with the user ID illustrated in FIG. 14.

The IP address is synonymous with the IP address illustrated in FIG. 14.

The angle-of-view information (pan, tilt, and fov) is angle-of-view information sent from the communication terminal 7 or 9 of the user (the host or a participant) indicated by the user ID in the same record.

The time stamp indicates the time at which the angle-of-view information in the same record was sent during recording. At the end of the recording, the storing and reading unit 59 described below converts the time stamp into an elapsed playback time. During playback of the recording, the storing and reading unit 59 described below stores the elapsed playback time from the start of playback. The playback of the recording may simply be referred to as "playback".

Speech Text Management DB

FIG. 17 conceptually illustrates an example of the speech text management DB 5004. The speech text management DB 5004 is configured in a table format. In the speech text management DB 5004, a user ID, an IP address, a text description, and a time stamp (or playback duration) are stored for each content ID in association with each other for management. The time stamp may also be referred to as a recording duration.

The user ID is synonymous with the user ID illustrated in FIG. 14.

The IP address is synonymous with the IP address illustrated in FIG. 14.

The text description is information obtained by converting a speech made by each user during recording into a text by speech recognition.

The time stamp indicates the duration of a speech corresponding to the text description in the same record during recording. For example, the speech text management DB 5004 indicates that the speech "Are you concerned about something?" lasted for a period of 3 seconds from 15:00:00.

Functional Configuration of Communication Control System

Referring back to FIG. 13, the functional configuration of the communication control system 5 will be described in detail.

The communication unit 51 of the communication control system 5 is mainly implemented by the network I/F 506 operating in accordance with instructions from the CPU 501 illustrated in FIG. 12. The communication unit 51 performs data communication with other devices (e.g., the relay device 3 and the communication terminals 7 and 9) via the communication network 100.

The reception unit 52 is mainly implemented by the operation unit 508 operating in accordance with instructions from the CPU 501. The reception unit 52 receives an operation input from the user (e.g., a system administrator or the like).

The creation unit 53 is mainly implemented by operation of the CPU 501. The creation unit 53 serves as a screen creation unit and creates a screen to be transmitted to the communication terminals 7 and 9 by using the data and the like stored in the storage unit 5000. The creation unit 53 further creates text from the audio information by speech recognition.

The authentication unit 55 performs authentication to determine, for example, whether each user is authorized to use the virtual room.

The storing and reading unit 59 is mainly implemented by operation of the CPU 501. The storing and reading unit 59 stores various types of data (or information) in the storage unit 5000 or reads various types of data (or information) from the storage unit 5000.

Functional Configuration of Communication Terminal 7

Referring to FIG. 13, the functional configuration of the communication terminal 7 will be described in detail. The communication terminal 7 includes a communication unit 71, a reception unit 72, a display control unit 74, an audio input/output control unit 75, a creation unit 76, a connection unit 78, and a storing and reading unit 79. The components of the communication terminal 7 are functions or means implemented by any one of the hardware elements illustrated in FIG. 12 operating in accordance with instructions from the CPU 501 according to a program for the communication terminal 7 loaded onto the RAM 503 from the SSD 504.

The communication unit 71 of the communication terminal 7 is mainly implemented by the network I/F 506 operating in accordance with instructions from the CPU 501 illustrated in FIG. 12. The communication unit 71 performs data communication with other devices (e.g., the communication control system 5) via the communication network 100.

The reception unit 72 is mainly implemented by the operation unit 508 operating in accordance with instructions from the CPU 501. The reception unit 72 receives an operation input from the user (i.e., the host X). The reception unit 72 also serves as an acquisition unit. In response to receiving display of a predetermined area in a wide-view image from the user, the reception unit 72 acquires angle-of-view information for specifying the predetermined area.

The display control unit 74 is mainly implemented by operation of the CPU 501. The display control unit 74 controls the display 507 of the communication terminal 7 or an external display connected to the external device connection I/F 505 to display various images.

The audio input/output control unit 75 is mainly implemented by operation of the CPU 501 of the communication terminal 7. The audio input/output control unit 75 performs control to collect sounds from an external microphone connected to the external device connection I/F 505. In one example, the communication terminal 7 includes a microphone. In this case, the audio input/output control unit 75 performs control to collect sounds from the microphone. Further, the audio input/output control unit 75 controls the speaker 512 of the communication terminal 7 or an external speaker connected to the external device connection I/F 505 to output a sound.

The creation unit 76 is mainly implemented by operation of the CPU 501. The creation unit 76 adds a voice-over or subtitles to video and audio content data recorded by the communication terminal 7 to create content data such as for teaching materials.

The storing and reading unit 79 is mainly implemented by operation of the CPU 501. The storing and reading unit 79 stores various types of data (or information) in a storage unit 7000 or reads various types of data (or information) from the storage unit 7000. The storage unit 7000 is implemented by the RAM 503 and the SSD 504 illustrated in FIG. 12.

Functional Configuration of Communication Terminal 9

Referring to FIG. 13, the functional configuration of the communication terminal 9 will be described in detail.

The communication terminal 9 includes a communication unit 91, a reception unit 92, a display control unit 94, an audio input/output control unit 95, a connection unit 98, and a storing and reading unit 99. The components of the communication terminal 9 are functions or means implemented by any one of the hardware elements illustrated in FIG. 12 operating in accordance with instructions from the CPU 501 according to a program for the communication terminal 9 loaded onto the RAM 503 from the SSD 504.

The communication terminal 9 further includes a storage unit 9000. The storage unit 9000 is implemented by the RAM 503 and the SSD 504 illustrated in FIG. 12.

The communication unit 91 of the communication terminal 9 is mainly implemented by the network I/F 506 operating in accordance with instructions from the CPU 501. The communication unit 91 performs data communication with other devices (e.g., the communication control system 5) via the communication network 100.

The reception unit 92 is mainly implemented by the operation unit 508 operating in accordance with instructions from the CPU 501. The reception unit 92 receives an operation input from the user (i.e., a participant). The reception unit 92 also serves as an acquisition unit. In response to receiving display of a predetermined area in a wide-view image from the user, the reception unit 92 acquires angle-of-view information for specifying the predetermined area.

The display control unit 94 is mainly implemented by operation of the CPU 501. The display control unit 94 controls the display 507 of the communication terminal 9 or an external display connected to the external device connection I/F 505 to display various images.

The audio input/output control unit 95 is mainly implemented by operation of the CPU 501 of the communication terminal 9. The audio input/output control unit 95 performs control to collect sounds from an external microphone connected to the external device connection I/F 505. In one example, the communication terminal 9 includes a microphone. In this case, the audio input/output control unit 95 performs control to collect sounds from the microphone. Further, the audio input/output control unit 95 controls the speaker 512 of the communication terminal 9 or an external speaker connected to the external device connection I/F 505 to output a sound.

The connection unit 98 is mainly implemented by the external device connection I/F 505 operating in accordance with instructions from the CPU 501. The connection unit 98 performs data communication with an external device connected to the communication terminal 9 in a wired or wireless way.

The storing and reading unit 99 is mainly implemented by operation of the CPU 501. The storing and reading unit 99 stores various types of data (or information) in the storage unit 9000 or reads various types of data (or information) from the storage unit 9000.

Processes or Operations According to First Embodiment

Next, processes or operations according to the first embodiment will be described with reference to FIGS. 18 to 26. The following processes are performed after the image capturing apparatus 10 and the communication terminals 7 and 9 have already participated in the same virtual room.

Process for Communicating Content Data in Communication System

Figure 18:
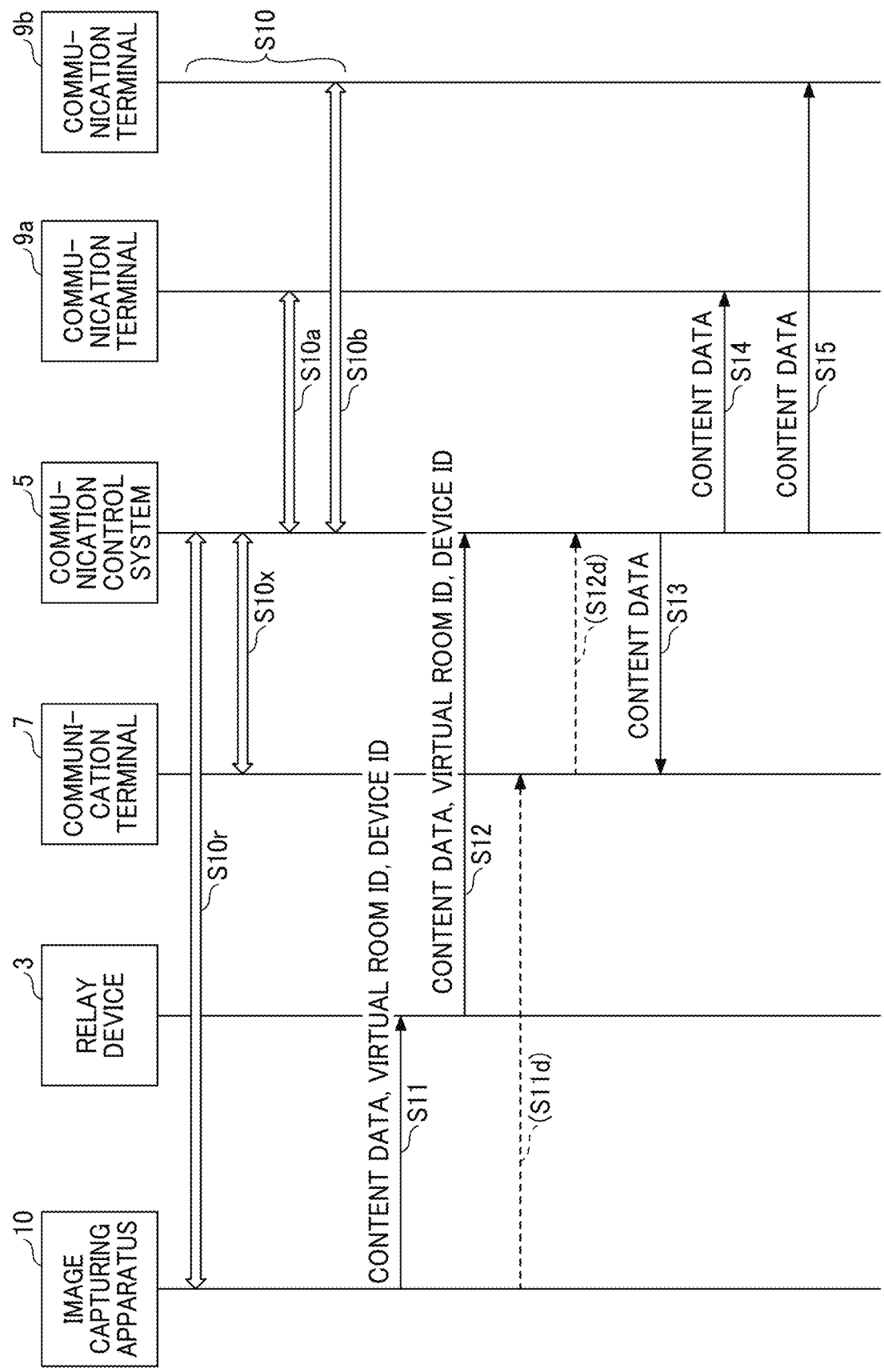
FIG. 18 is a sequence diagram illustrating a process for communicating content data in the communication system according to an embodiment of the present disclosure.

First, a process for communicating content data in the communication system 1a will be described with reference to FIG. 18. FIG. 18 is a sequence diagram illustrating a process for communicating a wide-view image and angle-of-view information in the communication system 1a. In this embodiment, the image capturing apparatus 10, the communication terminal 7 of the host X, the communication terminal 9a of the participant A, and the communication terminal 9b of the participant B are in the same virtual room. In response to the creation of a virtual room, the storing and reading unit 59 adds one record to the virtual room management DB 5002 (see FIG. 31) and manages a virtual room ID, a virtual room name, a device ID, a host ID, and a participant ID in association with each other. A content ID, a content URL, and an angle-of-view information URL are stored later. The processing of operations S10 to S15 illustrated in FIG. 18 is performed repeatedly, for example, about 30 or 60 times per second.

S10: The image capturing apparatus 10 establishes a communication session with the communication control system 5 (S10r) via the relay device 3. The communication session may be established without intervening a relay device. The communication terminal 7 establishes a communication session with the communication control system 5 (S10x). The communication terminal 9a establishes a communication session with the communication control system 5 (S10a). The communication terminal 9b establishes a communication session with the communication control system 5 (S10b). Accordingly, in one embodiment, video communication is performed among the communication terminals 7, 9a, and 9b. In another embodiment, the communication terminals 7, 9a, and 9b share a wide-view image captured by the image capturing apparatus 10 and audio information obtained by collecting sounds.

S11: In the image capturing apparatus 10, the imaging unit 16 captures a spherical image of an area in the site Sa and collects sounds to obtain content (wide-view image and audio information) data. After that, the connection unit 18 transmits the content data to the relay device 3. In this case, the connection unit 18 also transmits a virtual room ID for identifying the virtual room in which the image capturing apparatus 10 is participating and a device ID for identifying the image capturing apparatus 10 to the relay device 3. Thus, the connection unit 38 of the relay device 3 acquires the content data, the virtual room ID, and the device ID.

S12: In the relay device 3, the communication unit 31 transmits the content data, the virtual room ID, and the device ID, which are acquired by the connection unit 38 in operation S11, to the communication control system 5 via the communication network 100. Thus, in the communication control system 5, the communication unit 51 receives the content data, the virtual room, and the device ID.

The image capturing apparatus 10 may transmit the content data, the virtual room ID, and the device ID to the communication terminal 7 instead of the relay device 3 (S1id). In this case, the communication terminal 7 transmits the content data, the virtual room ID, and the device ID to the communication control system 5 (S12d).

S13: In the communication control system 5, the storing and reading unit 59 searches the virtual room management DB 5002 based on the virtual room ID received in operation S12 and reads the user IDs (i.e., the host ID and the participant IDs) of users participating in the same virtual room as the virtual room in which the image capturing apparatus 10 is participating. The storing and reading unit 59 further searches the user/device management DB 5001 based on the read host ID and participant IDs and reads the user image of the host X, the IP address of the communication terminal 7, the user images of the participants A and B, and the IP addresses of the communication terminals 9a and 9b. Then, the communication unit 51 refers to the IP address of the communication terminal 7 and transmits the content data received in operation S12 to the communication terminal 7. Thus, the communication unit 71 of the communication terminal 7 receives the content data. At this time, the communication unit 51 may transmit to the communication terminal 7 the content data associated with the user images and user IDs of the users participating in the corresponding virtual room.

S14: The communication unit 51 of the communication control system 5 refers to the IP address of the communication terminal 9a and transmits the content data received in operation S12 to the communication terminal 9a. Thus, the communication unit 91 of the communication terminal 9a receives the content data. At this time, the communication unit 51 may transmit to the communication terminal 9a the content data associated with the user images and user IDs of the users participating in the corresponding virtual room.

S15: The communication unit 51 of the communication control system 5 refers to the IP address of the communication terminal 9b and transmits the content data received in operation S12 to the communication terminal 9b. Thus, the communication unit 91 of the communication terminal 9b receives the content data. At this time, the communication unit 51 may transmit to the communication terminal 9b the content data associated with the user images and user IDs of the users participating in the corresponding virtual room.

Through the process described above, for example, in the communication terminal 9a, the display control unit 94 displays a predetermined-area image (see FIG. 6B) indicating a predetermined area (see FIG. 6A) determined in advance in the wide-view image received in operation S14, and the audio input/output control unit 95 outputs a sound based on the audio information received in operation S14. In response to the reception unit 92 receiving a screen operation by the participant A, the display control unit 94 changes the predetermined area T (see FIG. 6A) determined in advance and displays a predetermined-area image (see FIG. 6D) including the predetermined area T' (see FIG. 6C) in which an object or the like of interest to the participant A is displayed.

Process for Starting Video and Audio Recording in Communication System

Figure 19:
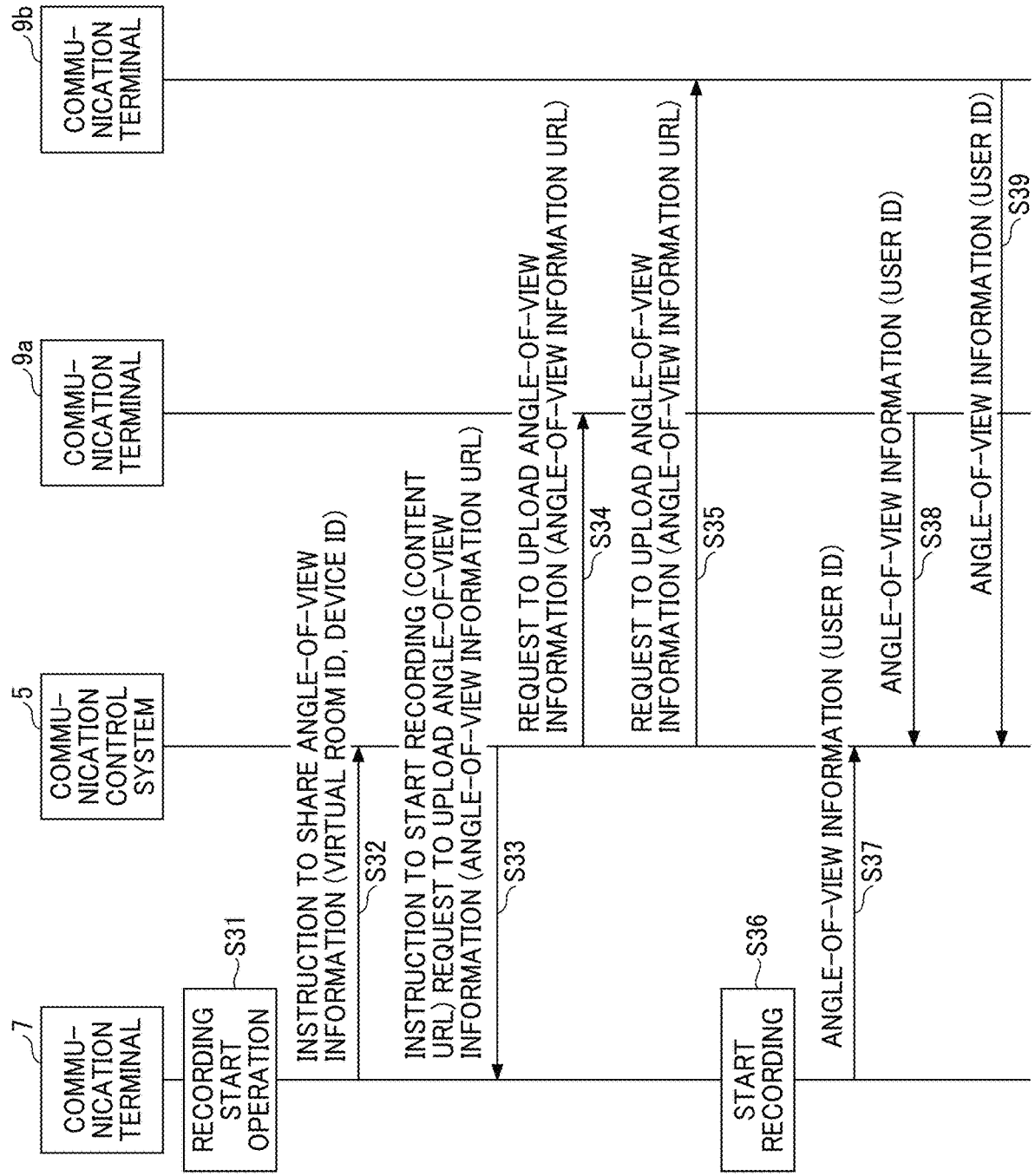
FIG. 19 is a sequence diagram illustrating a process for starting video and audio recording in the communication system according to an embodiment of the present disclosure.

Next, a process for starting video and audio recording in the communication system 1a will be described with reference to FIG. 19. FIG. 19 is a sequence diagram illustrating a process for starting video and audio recording in the communication system 1a.

S31: First, in the communication terminal 7 of the host X, the reception unit 72 receives an operation of starting video and audio recording (a recording start operation) from the host X.

S32: In the communication terminal 7, before the start of recording, the communication unit 71 transmits an instruction to the communication control system 5 to share angle-of-view information. The instruction includes the virtual room ID of the virtual room in which the communication terminal 7 is participating, and the device ID of the image capturing apparatus 10. Thus, the communication unit 51 of the communication control system 5 receives the instruction for sharing angle-of-view information.

S33: In the communication control system 5, the storing and reading unit 59 sets a content URL and an angle-of-view information URL in the virtual room management DB 5002 (see FIG. 15). Then, the communication unit 51 transmits an instruction to the communication terminal 7 to start recording. The communication unit 51 also transmits a request to the communication terminal 7 to upload angle-of-view information. The instruction includes information indicating a content URL indicating a location where the communication terminal 7 stores the content data after the recording. The request includes information indicating an angle-of-view information URL for maintaining the angle-of-view information. Thus, in the communication terminal 7, the communication unit 71 receives the instruction to start recording and the request to upload the angle-of-view information.

S34: The communication unit 51 further transmits a request to the communication terminal 9a to upload angle-of-view information. The request includes information indicating a URL for maintaining the angle-of-view information. Thus, in the communication terminal 9a, the communication unit 91 receives the request to upload the angle-of-view information.

S35: The communication unit 51 also transmits a request to the communication terminal 9b to upload angle-of-view information. The request includes information indicating a URL for maintaining the angle-of-view information. Thus, in the communication terminal 9b, the communication unit 91 receives the request to upload the angle-of-view information.

S36: Then, in the communication terminal 7, the storing and reading unit 79 serves as a video recording unit and an audio recording unit, and starts recording the content data received in operation S13 illustrated in FIG. 18. In operation S12d illustrated in FIG. 18, the communication terminal 7 may start recording the content data received from the image capturing apparatus 10 in operation S11d, instead of the content data received from the communication control system 5 in operation S13.

S37: In the communication terminal 7, for example, in response to the reception unit 72 receiving a change in the angle of view from the host X during the display of the predetermined-area image (see FIG. 6B) indicating a predetermined area (see FIG. 6A) of the wide-view image received in operation S13, the display control unit 74 displays a predetermined-area image (see FIG. 6D) indicating a predetermined area (see FIG. 6C) obtained by changing the angle of view for the same wide-view image. In this case, the reception unit 72 also serves as an acquisition unit. In response to receiving display of a predetermined area in the wide-view image from the user (i.e., the host X), the reception unit 72 acquires angle-of-view information (pan, tilt, and fov) for specifying the predetermined area to be displayed in the wide-view image on the display 507. Then, the communication unit 71 transmits the angle-of-view information for specifying the predetermined area obtained by the change of the angle of view to the angle-of-view information URL (the communication control system 5) received in operation S33. The angle-of-view information includes the user ID of the host X of the communication terminal 7 as a transmission source from which the angle-of-view information is transmitted. Thus, in the communication control system 5, the communication unit 51 receives the angle-of-view information. Then, the storing and reading unit 59 stores the user ID, the IP address of the transmission source, the angle-of-view information, and the time stamp in the angle-of-view information management DB 5003 (see FIG. 16). The time stamp indicates the time at which the angle-of-view information is received in operation S37.

S38: The communication terminal 9a and the communication control system 5 also perform processing similar to that in operation S37, independently of operation S37. In this case, the transmitted user ID is the user ID of the participant A.

S39: The communication terminal 9b and the communication control system 5 also perform processing similar to that in operation S37, independently of operations S37 and S38. In this case, the transmitted user ID is the user ID of the participant B.

The processing of operations S37 to S39 may be collectively performed on the communication control system 5 at the end of the recording.

Process for Stopping Video and Audio Recording in Communication System

Figure 20:
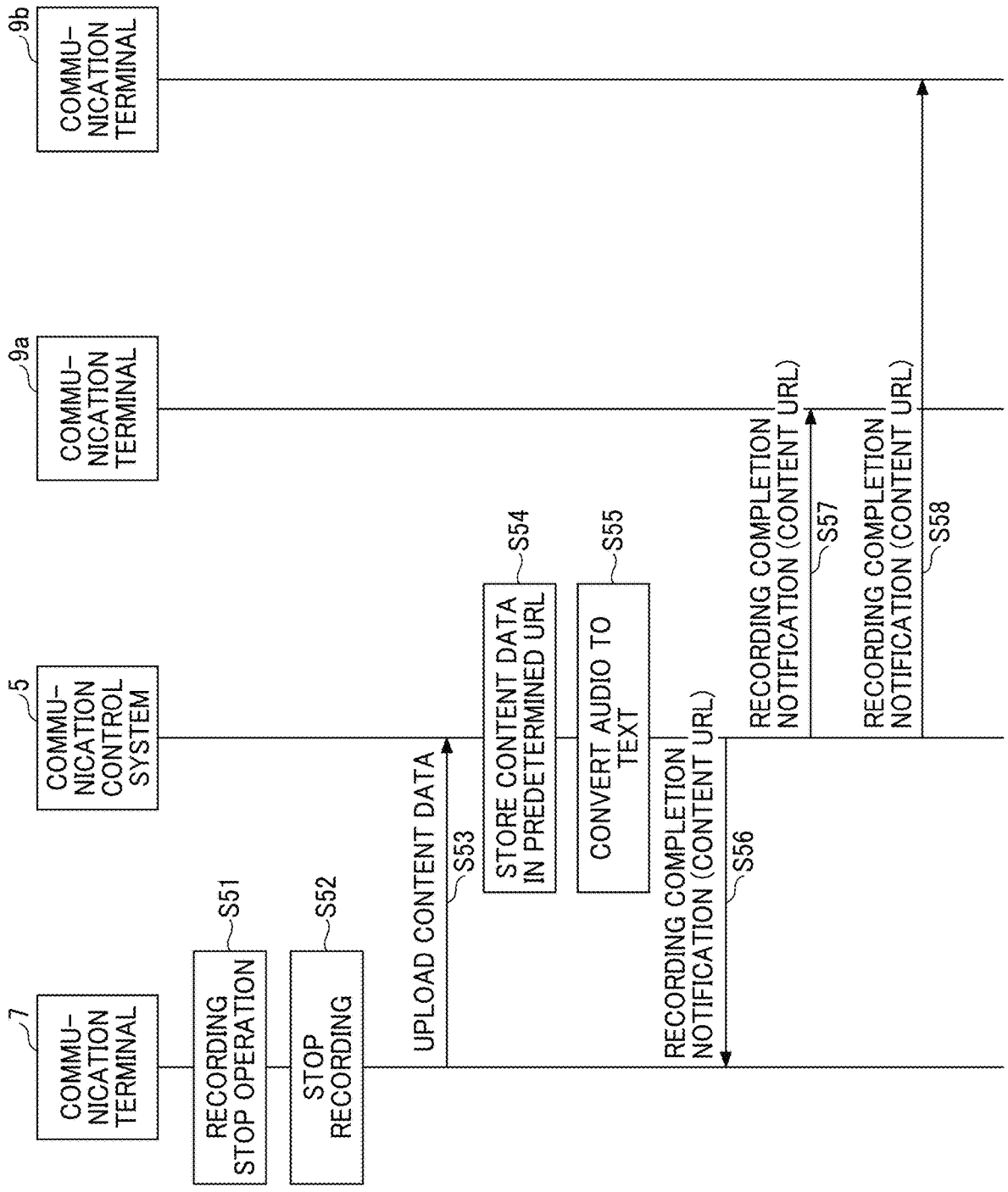
FIG. 20 is a sequence diagram illustrating a process for stopping video and audio recording in the communication system according to an embodiment of the present disclosure.

Next, a process for stopping video and audio recording in the communication system 1a will be described with reference to FIG. 20. FIG. 20 is a sequence diagram illustrating a process for stopping video and audio recording in the communication system 1a.

S51: First, in the communication terminal 7 of the host X, the reception unit 72 receives an operation of stopping video and audio recording (a recording stop operation) from the host X.

S52: The storing and reading unit 79 stops recording the content data.

S53: The communication unit 71 uploads (transmits) the recorded content data to a predetermined content URL (the communication control system 5) received in operation S33. The content data includes a time (timestamp) from the start to the end of the recording. Thus, in the communication control system 5, the communication unit 51 receives the content data.

S54: In the communication control system 5, the storing and reading unit 59 stores the content data and the time stamp in a predetermined content URL. Further, the storing and reading unit 59 converts the time stamp, which is managed in the angle-of-view information management DB 5003 (see FIG. 16), into an elapsed playback time (elapsed recording time) in accordance with the total recording time of the content data for which the recording is stopped.

S55: The creation unit 53 converts the audio information in the content data stored in operation S54 into text by speech recognition. In one embodiment, the creation unit 53 identifies a playback duration (recording duration) of a speech when converting the speech into a text. Then, the storing and reading unit 59 stores, in the speech text management DB 5004 (see FIG. 17), for each content ID of content data from which audio information is obtained, a user ID of a user who is a speaker, an IP address of a communication terminal of the speaker, a text description obtained by converting a speech made by the speaker into a text, and a time stamp (a recording duration or a playback duration) in association with each other. The time stamp indicates a speech duration described below.

S56: The communication unit 51 transmits a recording completion notification to the communication terminal 7. The recording completion notification includes information indicating the predetermined content URL. Thus, the communication unit 71 of the communication terminal 7 receives the recording completion notification.

S57: The communication unit 51 also transmits a recording completion notification to the communication terminal 9a. The recording completion notification includes information indicating the predetermined content URL. Thus, the communication unit 91 of the communication terminal 9a receives the recording completion notification.

S58: The communication unit 51 also transmits a recording completion notification to the communication terminal 9b. The recording completion notification includes information indicating the predetermined content URL. Thus, the communication unit 91 of the communication terminal 9b receives the recording completion notification.

In one embodiment, in operation S56, the recording completion notification does not include the predetermined content URL.

Process for Playing Back Video and Audio Recordings in Communication System

Figure 21:
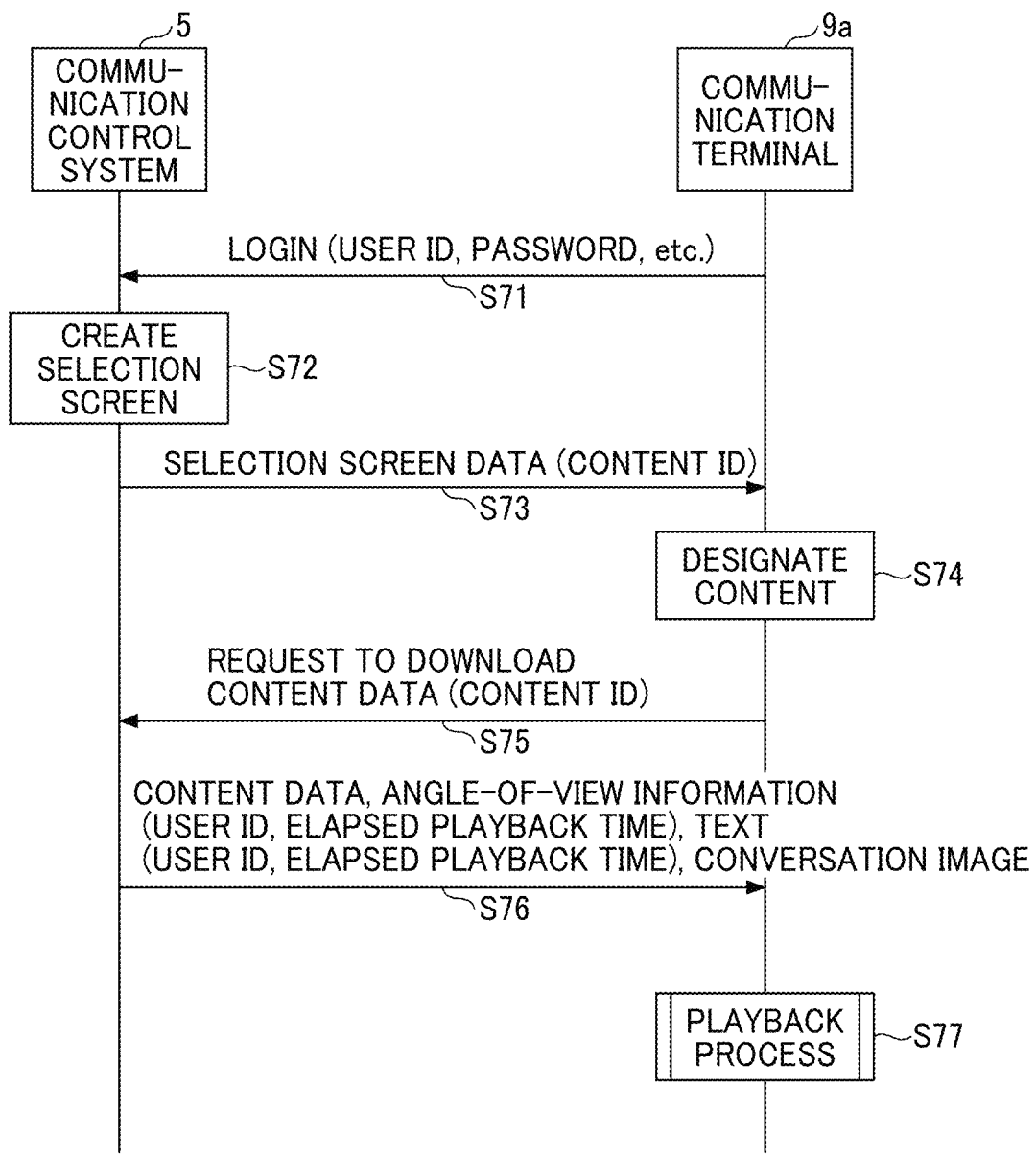
FIG. 21 is a sequence diagram illustrating a process for playing back video and audio recordings in the communication system according to an embodiment of the present disclosure.
Figure 22:
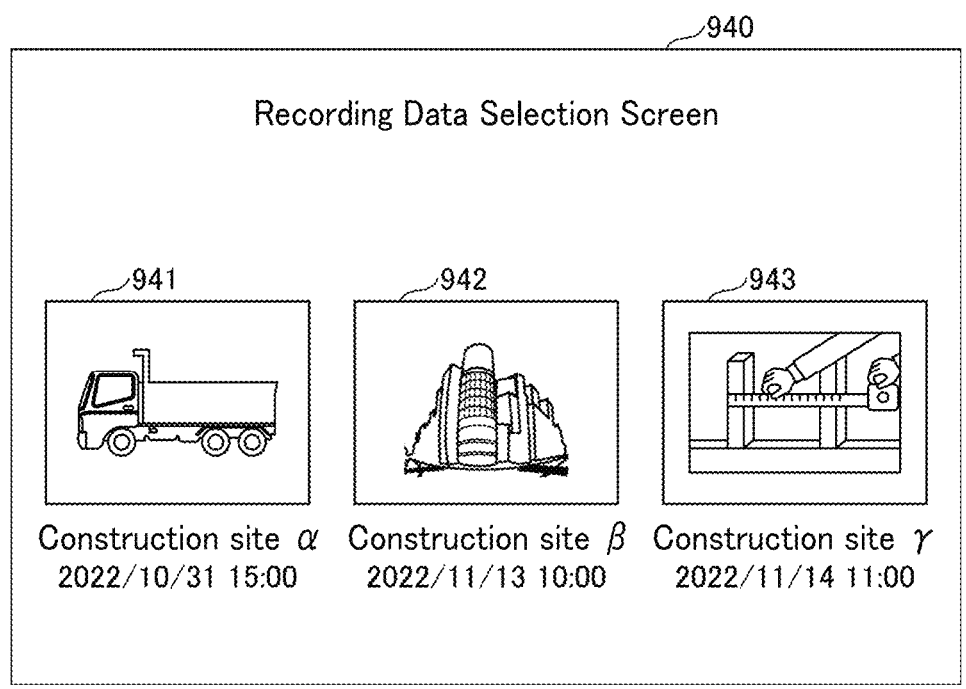
FIG. 22 is an illustration of an example of a recording data selection screen.

Next, a process for playing back video and audio recordings in the communication system 1a will be described with reference to FIGS. 21 to 26. FIG. 21 is a sequence diagram illustrating a process for playing back video and audio recordings in the communication system 1a. FIG. 22 illustrates an example of a recording data selection screen. In the illustrated example, the participant A who has participated in the virtual room during recording uses the communication terminal 9a during the playback of the recordings to play back recorded content data.

S71: First, in response to the reception unit 92 of the communication terminal 9a receiving a login operation with login information such as a user ID and a password entered from the participant A, the communication unit 91 transmits a login request to the communication control system 5. The login request includes the user ID of the participant A and the password of the participant A. Thus, in the communication control system 5, the communication unit 51 receives the login request, and the authentication unit 55 refers to the user/device management DB 5001 (see FIG. 14) to perform authentication. The following description will be given assuming that the participant A is determined to be an authorized access user through login authentication.

S72: In the communication control system 5, the creation unit 53 creates a recording data selection screen 940 as illustrated in FIG. 22. In this case, the storing and reading unit 59 searches the virtual room management DB 5002 (see FIG. 15) by using the user ID received in operation S71 as a search key and reads all of the associated virtual room IDs, virtual room names, and content URLs. Then, the creation unit 53 creates thumbnails 941, 942, and 943 by using images in the respective items of content data (with time stamps) stored in the content URLs. As a result, the creation unit 53 assigns each thumbnail a virtual room name (such as "construction site a") and a recording time (such as "2022/10/31 15:00", which means 3 p.m. on Oct. 31, 2022) indicating a predetermined time (e.g., the recording start time) of the time stamp.

S73: The communication unit 51 transmits selection screen data of the recording data selection screen created in operation S72 to the communication terminal 9a. The selection screen data includes, for each thumbnail, a content ID for identifying a wide-view image from which the thumbnail is generated. Thus, the communication unit 91 of the communication terminal 9a receives the selection screen data.

S74: In the communication terminal 9a, the display control unit 94 causes the display 507 of the communication terminal 9a to display the recording data selection screen as illustrated in FIG. 22. Then, the reception unit 92 receives designation (selection) of one of the thumbnails from the participant A. The following description will be given assuming that the thumbnail 941 is designated (selected).

S75: The communication unit 71 transmits a request to the communication control system 5 to download the content data from which the selected thumbnail 941 is generated. The request includes the content ID associated with the thumbnail 941. Thus, the communication unit 51 of the communication control system 5 receives the request to download the content data.

S76: In the communication control system 5, the storing and reading unit 59 searches the virtual room management DB 5002 (see FIG. 15) by using the content ID received in operation S75 as a search key and reads the content data from the corresponding content URL. Further, the storing and reading unit 59 reads the information on the user IDs, the angle-of-view information, and the elapsed recording times (elapsed playback times) from the angle-of-view information management DB 5003 (see FIG. 16) stored in the angle-of-view information URL. The storing and reading unit 59 further searches the speech text management DB 5004 (see FIG. 17) by using the content ID received in operation S75 as a search key and reads the corresponding user IDs, text descriptions, and playback durations (recording durations). Then, the communication unit 51 transmits angle-of-view information, texts, and video conversation images to the communication terminal 9a together with the requested content data during recording. The angle-of-view information specifies a display area displayed by each of the users identified by the read user IDs during recording. The texts indicate the content of the respective speeches made by the users during recording. The video conversation images indicate the content of the respective video conversations held by the users. The angle-of-view information includes a user ID and an elapsed playback time (elapsed recording time). Each text includes a user ID and a playback duration (recording duration). Thus, the communication unit 91 of the communication terminal 9a receives the content data, the items of angle-of-view information of the respective users, the texts for the respective users, and the video conversation images.

S77: In the communication terminal 9a, the display control unit 94 causes the display 507 of the communication terminal 9a to display a recorded image, and the audio input/output control unit 95 performs a playback process.

Details of Playback Process

Figure 23:
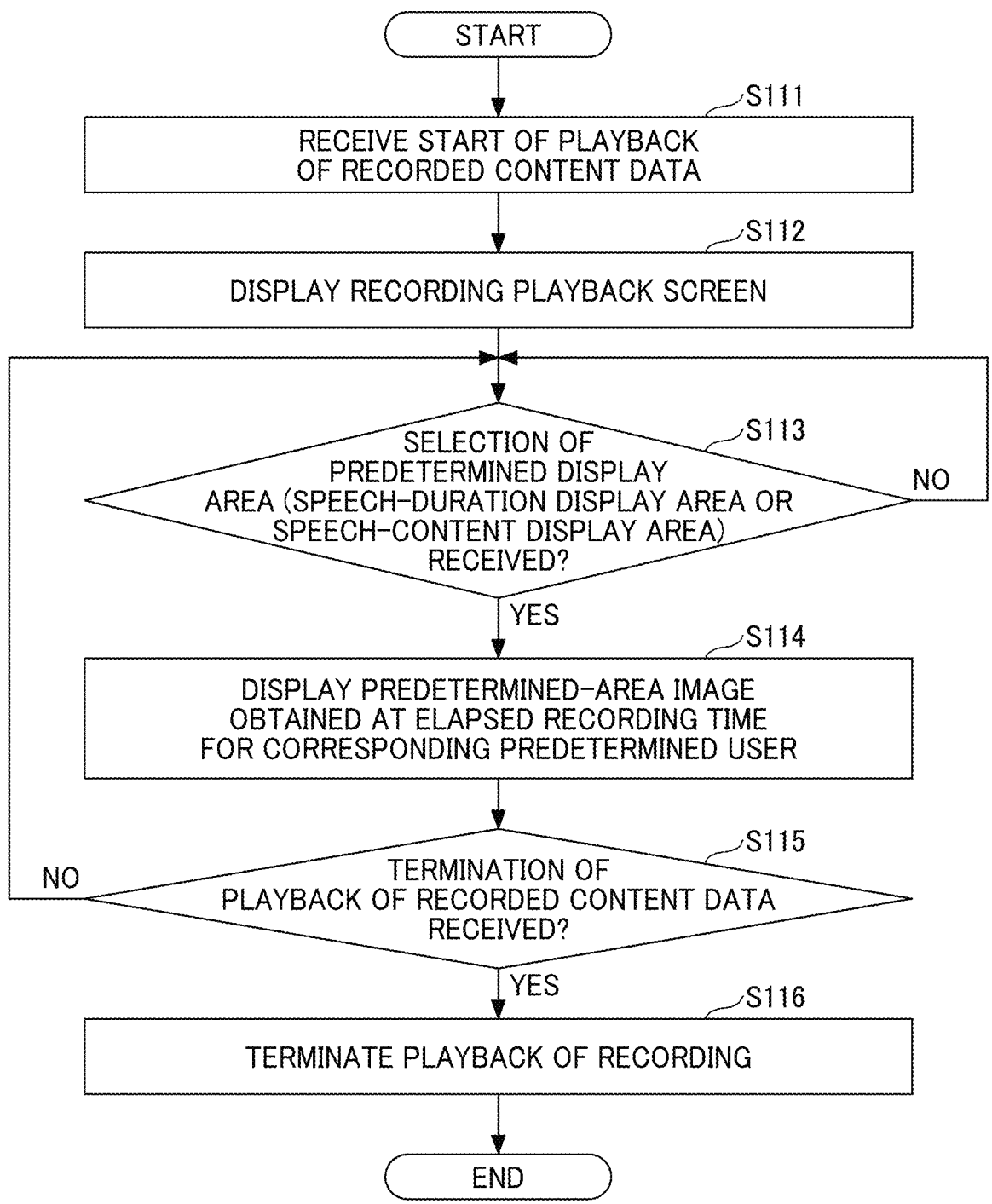
FIG. 23 is a flowchart illustrating a playback process according to an embodiment of the present disclosure.

Next, the playback process in operation S77 will be described in detail with reference to FIGS. 23 to 26. FIG. 23 is a flowchart illustrating the playback process.

S111: First, the reception unit 92 receives a start of playback of recorded content data from the participant A.

Figure 24:
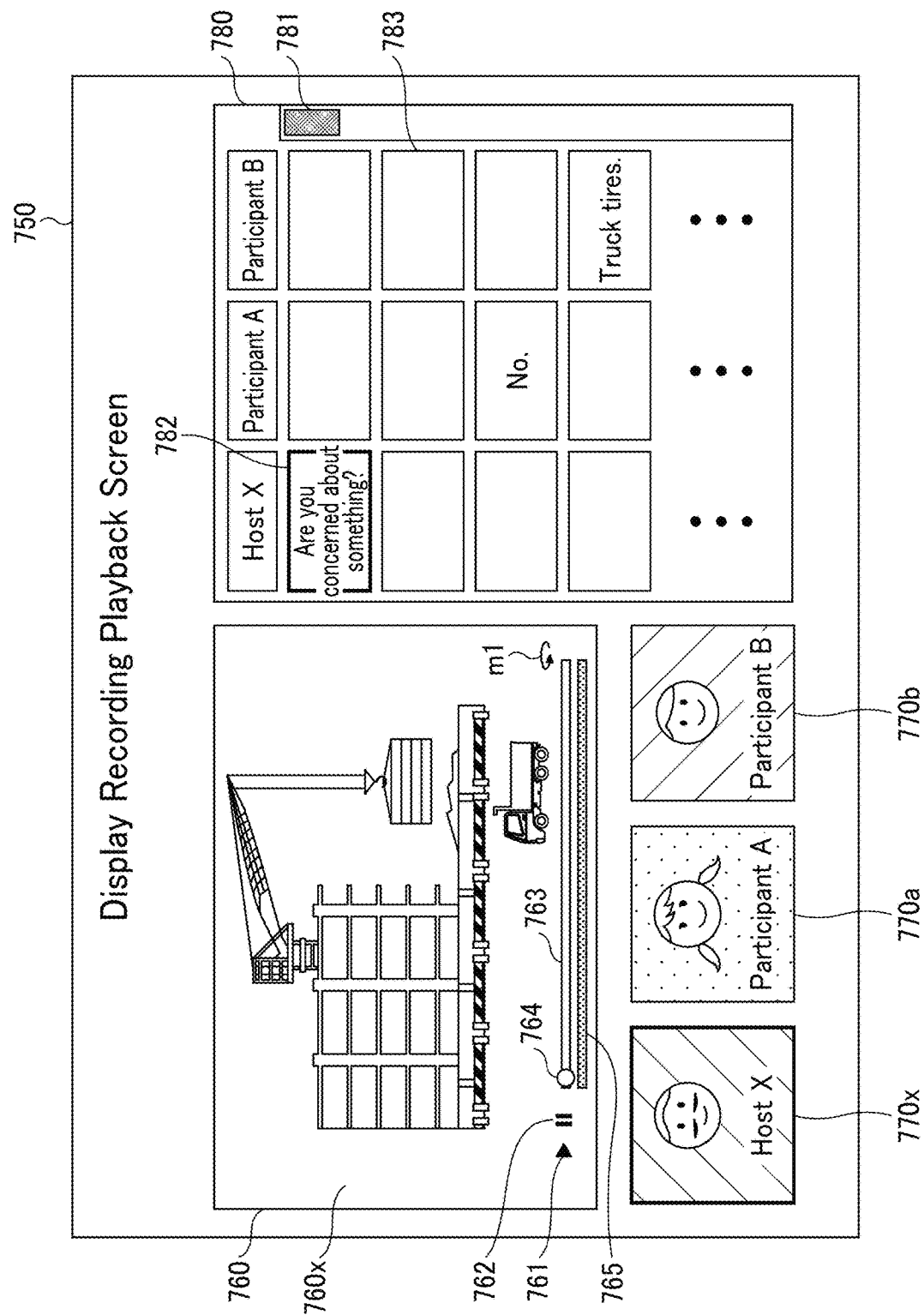
FIG. 24 is an illustration of an example of a recording playback screen that is displayed initially according to an embodiment of the present disclosure.

S112: The display control unit 94 causes the display 507 of the communication terminal 9a to display a recording playback screen 750 as illustrated in FIG. 24, based on the content data, the items of angle-of-view information, and the texts received in operation S76. FIG. 24 illustrates an example of the recording playback screen 750, which is displayed initially.

As illustrated in FIG. 24, the recording playback screen 750 displays a display area 760 for a predetermined-area image, and images 770x, 770a, and 770b of the faces of the users (the host X, the participant A, and the participant B) appearing in video conversation images captured by the communication terminals 7, 9a, and 9b during recording. The recording playback screen 750 further displays a display area 780 for speech texts. The display area 760 displays a predetermined-area image 760x. The predetermined-area image 760x is the same as a predetermined-area image that is initially displayed on the communication terminal 7 by the host X during recording. In this case, the display control unit 94 identifies a predetermined area in the wide-view image received in operation S76 by using the angle-of-view information that is also received in operation S76 for the user ID of the host X and that specifies an elapsed playback time of 00:00.

The display area 760 also displays a mark ml. The mark ml indicates that the user (e.g., the participant A) is allowed to change a predetermined-area image displayed in the display area 760 (see the change from the image illustrated in FIG. 6B to the image illustrated in FIG. 6D) by changing a predetermined area in a moving image of a wide-view image (see the change from the predetermined area T illustrated in FIG. 6A to the predetermined area T' illustrated in FIG. 6C). The display area 760 displays a play button 761, a play pause button 762, a seek bar 763, and a slider 764 to perform an operation on the predetermined-area image (in the illustrated example, the predetermined-area image 760x) displayed in the display area 760.

Figure 25:
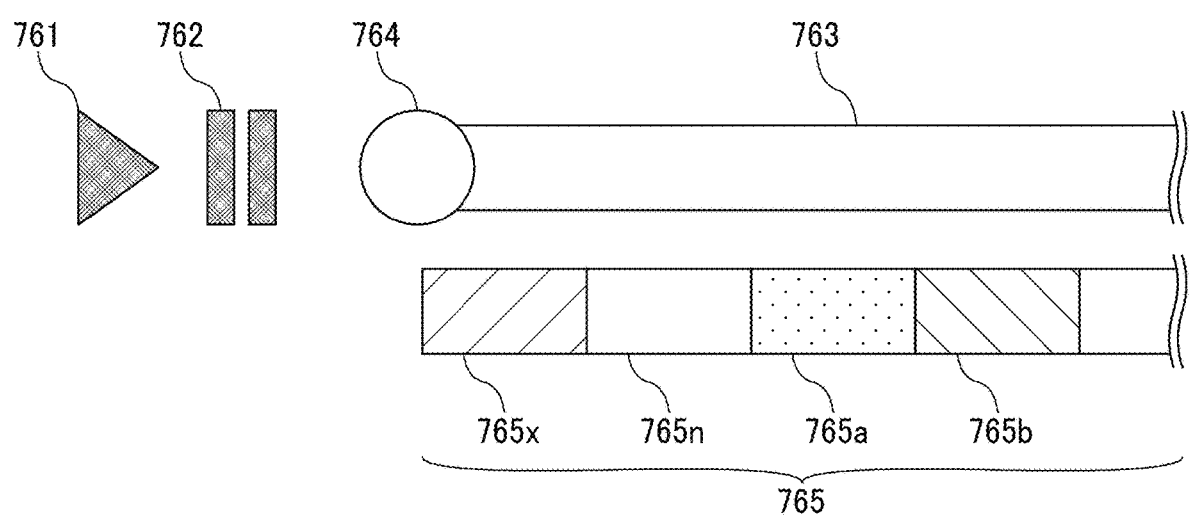
FIG. 25 is an illustration of an example of a speech-duration display area group and its surrounding elements.

The display area 760 also displays a speech-duration display area group 765 indicating a group of display areas related to the durations of speeches made by the respective users during recording (recording durations) in accordance with the length of the seek bar 763. The speech-duration display area group 765 will be described in detail with reference to FIG. 25. FIG. 25 illustrates the speech-duration display area group 765 and its surrounding elements. As illustrated in FIG. 25, the speech-duration display area group 765 includes speech-duration display areas 765x, 765a, and 765b. The speech-duration display areas 765x, 765a, and 765b are visual representations of the durations of speeches made by the respective users during recording (recording durations). The speech-duration display area group 765 also includes a silent-period display area 765n. The silent-period display area 765n is a visual representation of a silent period. The speech-duration display areas 765x, 765a, and 765b and the silent-period display area 765n are displayed side by side from left to right in chronological order of speeches, and the horizontal lengths thereof are specified based on the user IDs and the playback durations of the texts received in operation S76.

The speech-duration display areas 765x, 765a, and 765b have different display modes. The display modes of the speech-duration display areas 765x, 765a, and 765b are the same as or similar to the display modes of the images 770x, 770a, and 770b of the faces of the users (the host X, the participant A, and the participant B), respectively. The display modes are different in shape, pattern, or color. In one example, the speech-duration display area 765x and the image 770x of the face of the user (e.g., the host X) have the same or similar display modes. This allows the viewing user (e.g., the participant A) to easily grasp that the host X is the speaker during the speech duration indicated by the speech-duration display area 765x. In this case, the border around the image 770x of the face of the user (the host X) illustrated in FIG. 24 is displayed thick. The thick border allows the viewing user (e.g., the participant A) to more easily grasp that the host X is the speaker during the speech duration indicated by the speech-duration display area 765x.

In operation S76, the communication unit 51 of the communication control system 5 may transmit the user IDs and the user images, which are managed in the user/device management DB 5001 (see FIG. 14), to the communication terminal 9a without transmitting the video conversation images. In this case, the images 770x, 770a, and 770b of the faces of the users (the host X, the participant A, and the participant B) are fixed images of the faces of the respective users.

The display area 780 displays speech-content display areas 782, for example. The speech-content display areas 782 display, for each of the users (i.e., the host X, the participant A, and the participant B) who have participated in the remote communication during recording, a text indicating the content of a speech made during each recording duration. In the speech-content display areas 782, the content of a text during each playback duration is displayed for each of the user IDs received in operation S76. The speech-content display areas 782 are displayed side by side from top to bottom in chronological order of speeches. The display area 780 also displays a scroll bar 781 to allow the user to move up and down the speech-content display areas 782.

For a silent period during which no one makes a speech, a speech-content display area 783 containing no text description is provided. The speech-content display area 783 may have a display mode in which, as illustrated in FIG. 24, the speech-content display area 783 remains blank, as way of example. In another example, the speech-content display area 783 may contain a text such as "N/A" or a symbol such as an asterisk (***).

In FIG. 24, the predetermined-area image 760x, which is displayed on the communication terminal 7 of the host X during recording, is displayed in the display area 760. In addition, one of the speech-content display areas 782 that contains a text indicating the content of the speech made by the host X during the display of the predetermined-area image 760x is displayed with a thick border therearound. The thick border around one of the speech-content display areas 782 allows the viewing user (e.g., the participant A) to easily grasp that the host X is the speaker during the speech duration indicated by the corresponding one of the speech-content display areas 782 and also to grasp the content of the speech made by the host X.

S113: Referring back to FIG. 23, the reception unit 92 of the communication terminal 9a determines whether the selection of a predetermined display area (a speech-duration display area or a speech-content display area) has been received from the participant A. If no predetermined display area is selected (NO), the processing of operation S113 is repeatedly performed. In this case, if the play button 761 is pressed and then no other button is pressed, in FIG. 24, the thick border moves down across the speech-content display areas 782 for the host X with time, and the slider 764 moves to the right with time. Accordingly, predetermined-area images 760x, which are displayed by the host X during recording, are sequentially displayed in the display area 760.

Figure 26:
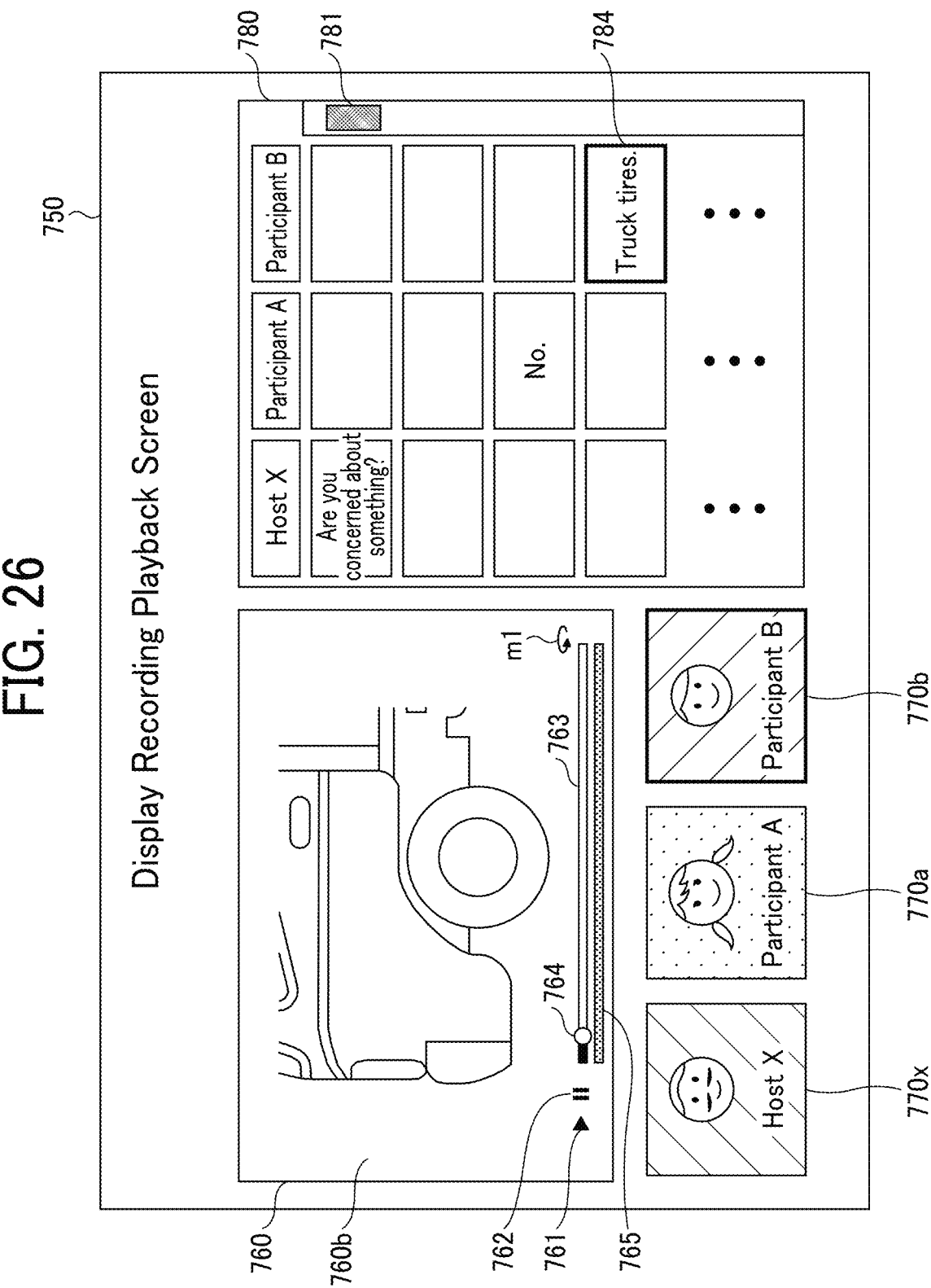
FIG. 26 is an illustration of an example of the recording playback screen displayed in response to selection of a predetermined display area (a speech-duration display area or a speech-content display area)

S114: If the selection of a predetermined display area has been received (YES in S113), as illustrated in FIG. 26, the display control unit 94 displays a predetermined-area image obtained at an elapsed recording time for a predetermined user corresponding to the selected predetermined display area. FIG. 26 illustrates an example of the recording playback screen 750 displayed in response to selection of a predetermined display area (a speech-duration display area or a speech-content display area). In FIG. 26, the display control unit 94 displays a predetermined-area image 760b in the display area 760. The predetermined-area image 760b is obtained at the elapsed recording time for the participant B corresponding to a speech-content display area 784 or the speech-duration display area 765b illustrated in FIG. 25. The display control unit 94 switches from the predetermined-area image 760x displayed by the host X during recording, as illustrated in FIG. 24, to the predetermined-area image 760b displayed by the participant B during recording, as illustrated in FIG. 26, and displays the predetermined-area image 760b. In one embodiment, the display control unit 94 may display the predetermined-area image 760b in a larger size and display the predetermined-area image 760x in a smaller size without switching from the predetermined-area image 760x to the predetermined-area image 760b. Also in this case, as illustrated in FIG. 26, the display control unit 94 displays the image 770b of the face of the participant B corresponding to the selected speech-content display area 784 or the speech-duration display area 765b illustrated in FIG. 25 with a thick border displayed around the image 770b.

Accordingly, in one embodiment, the participant A, who is the viewing user during playback of the recording, selects a predetermined display area (the speech-duration display area 765b or the speech-content display area 784) related to the participant B to view the predetermined-area image 760b, which is displayed by the participant B on the communication terminal 9b during recording.

In the example described above, when the speech-content display area 782 for the host X is being displayed, the speech-content display area 784 for a different user (i.e., the participant B) is selected. Even if a speech-content display area for the same user (i.e., the host X) is selected, the display control unit 94 performs similar processing and displays a predetermined-area image that is displayed by the host X during recording but is different from the predetermined-area image 782.

S115: If the reception unit 72 does not receive termination of playback of the recorded content data from the participant A (NO), the process returns to operation S113.

S116: If the reception unit 72 receives termination of playback of the recorded content data from the participant A (YES in S115), the display control unit 94 terminates the playback of the recording.

As described above, an embodiment of the present disclosure allows a predetermined user during playback of the recording to easily grasp which predetermined area in a wide-view image each user was viewing while making a speech during recording.

That is, according to an embodiment of the present disclosure, during playback of a recorded moving image, it becomes possible to easily determine which predetermined area in a wide-view image each user was viewing while making a speech during recording of the moving image.

Second Embodiment

A second embodiment will now be described with reference to the drawings.

Overview of Communication System According to Second Embodiment

Figure 27:
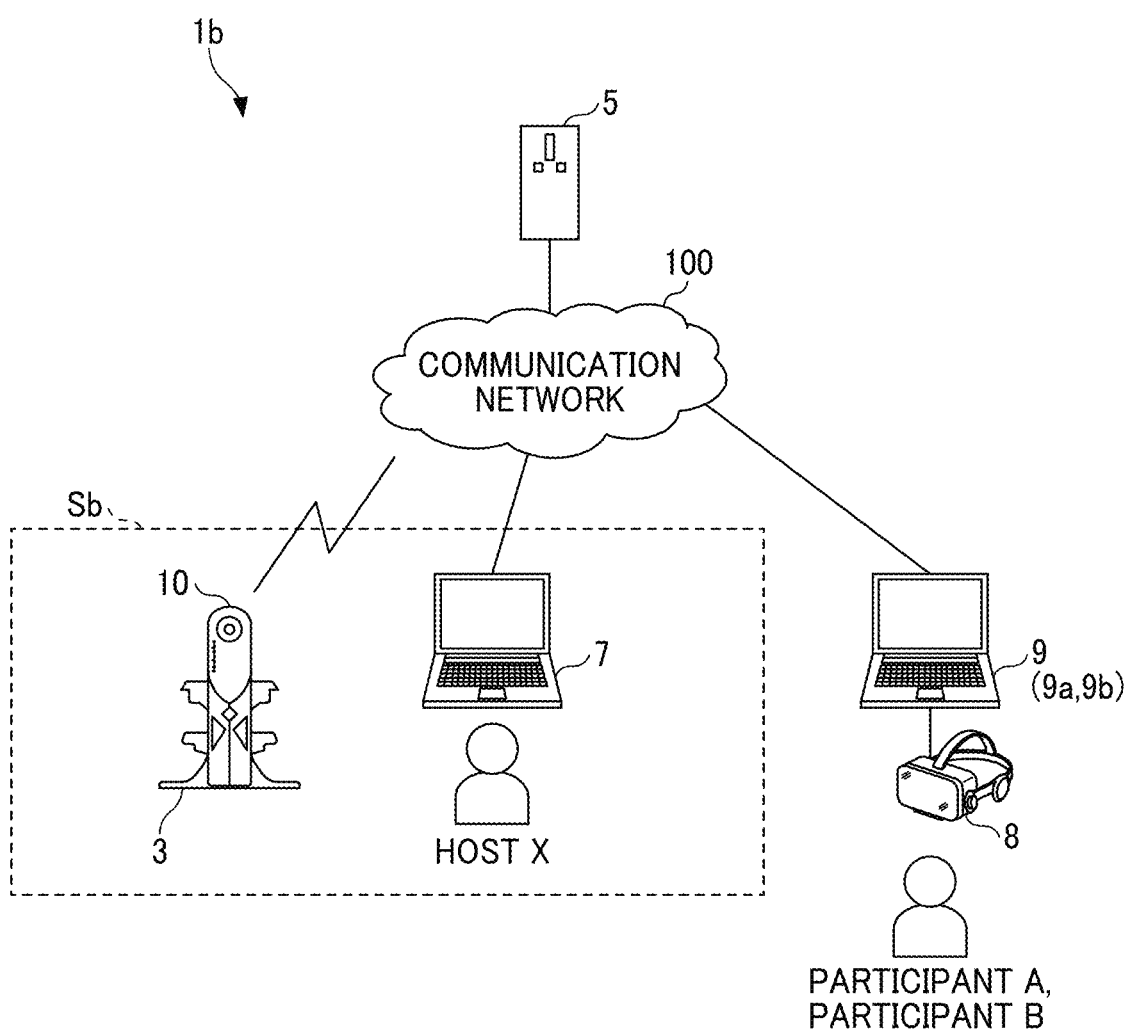
FIG. 27 is a schematic diagram of a communication system according to a second embodiment of the present disclosure.

An overview of a communication system 1b according to the second embodiment will be described with reference to FIG. 27. FIG. 27 is a schematic diagram of the communication system 1b according to the second embodiment.

As illustrated in FIG. 27, the communication system 1b according to this embodiment includes virtual reality (VR) goggles 8 in addition to the components of the communication system 1a illustrated in FIG. 9. The image capturing apparatus 10 and the relay device 3 are placed at predetermined positions by a host X or the like in a site Sb such as a construction site, an exhibition site, an education site, or a medical site.

The VR goggles 8 are connected to the communication terminal 9 in a wired or wireless way. In one embodiment, the VR goggles 8 play back content data received by the communication terminal 9.

Hardware Configurations in Second Embodiment

Since the communication system 1b includes the same devices (terminals and system) as those of the communication system 1a according to the first embodiment except for the VR goggles 8, the hardware configuration of the VR goggles 8 will be described here.

Figure 28:
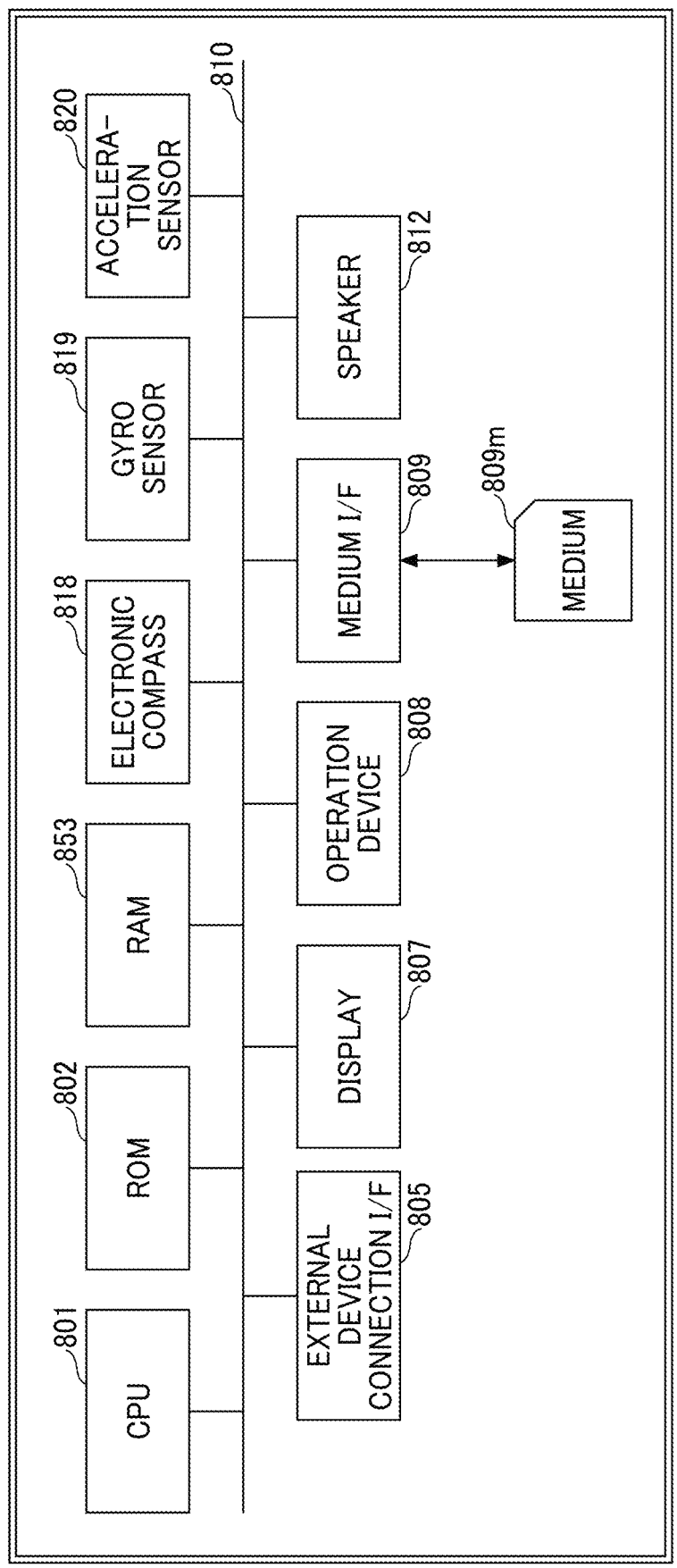
FIG. 28 is a block diagram illustrating an example hardware configuration of virtual reality (VR) goggles.

As illustrated in FIG. 28, the VR goggles 8 are a computer including a CPU 801, a ROM 802, a RAM 803, an external device connection I/F 805, a display 807, an operation unit 808, a medium I/F 809, a bus line 810, a speaker 812, an electronic compass 818, a gyro sensor 819, and an acceleration sensor 820.

The CPU 801 controls entire operation of the VR goggles 8. The ROM 802 stores an IPL or any other program used for booting the CPU 801. The RAM 803 is used as a work area for the CPU 801.

The external device connection I/F 805 is an interface for connecting the VR goggles 8 to various external devices. Examples of the external devices include, but are not limited to, the communication terminal 9.

The display 807 is a type of display device such as a liquid crystal display or an organic EL display that displays various images.

The operation unit 808 is an input means operated by a user to select or execute various instructions, select a target for processing, or move a cursor being displayed. Examples of the input means include various operation buttons, a power switch, a physical button, and a line-of-sight operation circuit that is operated in response to detection of the line of sight of the user.

The medium I/F 809 controls reading or writing (storing) of data from or to a recording medium 809m such as a flash memory. Examples of the recording medium 809m include a DVD and a Blu-ray Disc©.

The speaker 812 is a circuit that converts an electric signal into physical vibration to generate sound such as music or voice.

The electronic compass 818 calculates an orientation of the VR goggles 8 from the Earth's magnetism and outputs orientation information.

The gyro sensor 819 detects a change in tilt (roll, pitch, and yaw) of the VR goggles 8 with movement of the VR goggles 8.

The acceleration sensor 820 detects acceleration in three axial directions.

The bus line 810 is an address bus, a data bus, or the like for electrically connecting the components such as the CPU 801 to each other.

Use of VR Goggles

Figure 29:
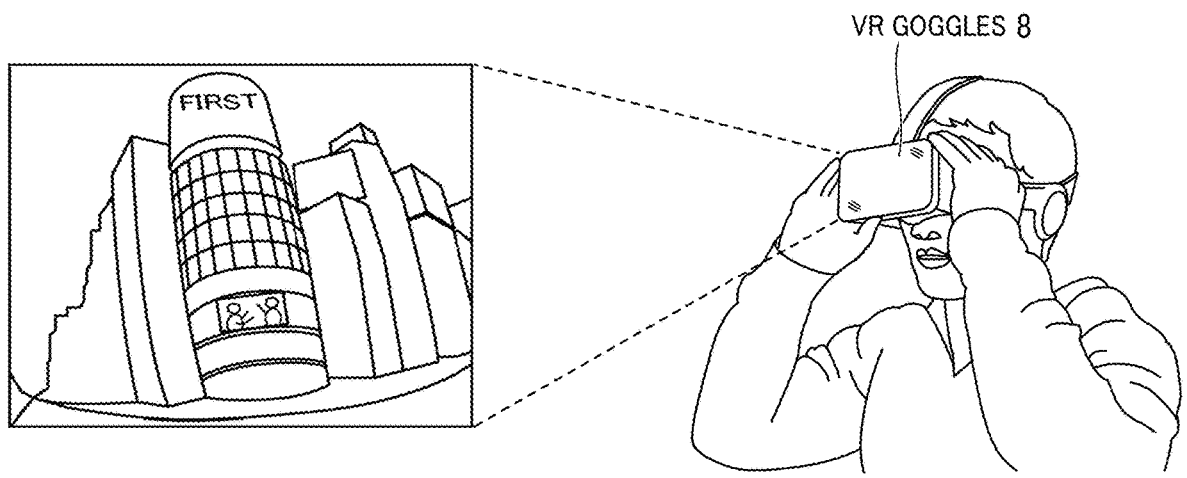
FIG. 29 is an illustration of an example of how a user uses the VR goggles.
Figure 30:
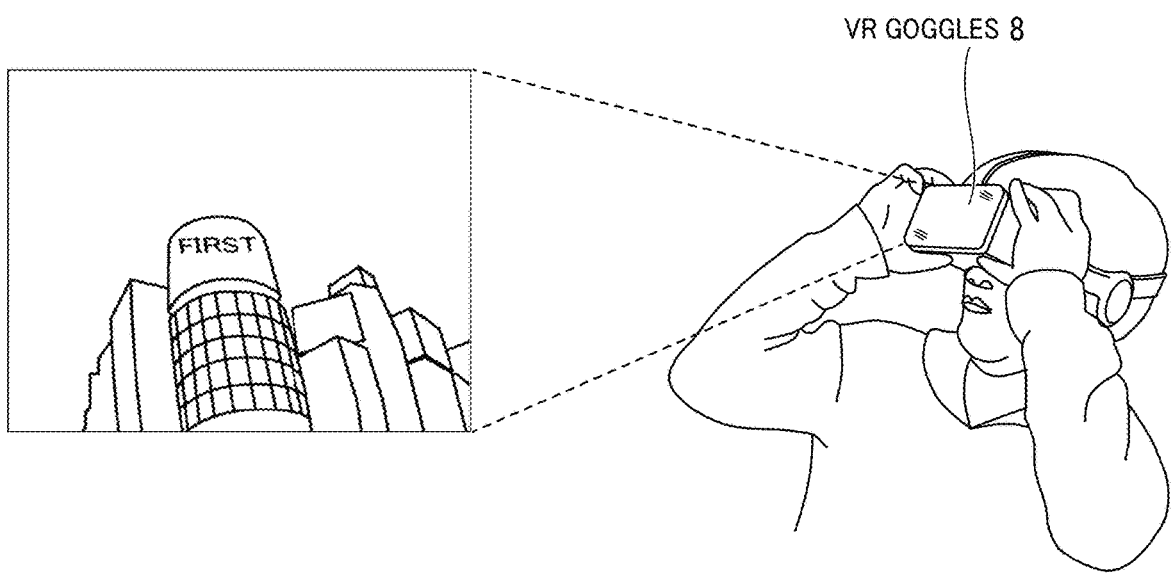
FIG. 30 is an illustration of an example of how the user uses the VR goggles.

Next, an image of how the user uses the VR goggles 8 will be described with reference to FIGS. 29 and 30. FIGS. 29 and 30 illustrate images of how the user uses the VR goggles 8.

The VR goggles 8 are connected to a communication terminal. As illustrated in FIG. 29, the user places the VR goggles 8 on his or her head to view a VR image presented on the display 807 in the VR goggles 8. As illustrated in FIG. 30, in response to the user tilting his or her head upward with the VR goggles 8 on his or her head, the VR goggles 8 display the scene above the scene appearing in the original VR image by means of, for example, the electronic compass 818, the gyro sensor 819, and the acceleration sensor 820. This enables the user to experience a feeling as if the user were in the image.

Functional Configurations in Second Embodiment

Next, functional configurations in the second embodiment will be described with reference to FIG. 31.

Figure 31:
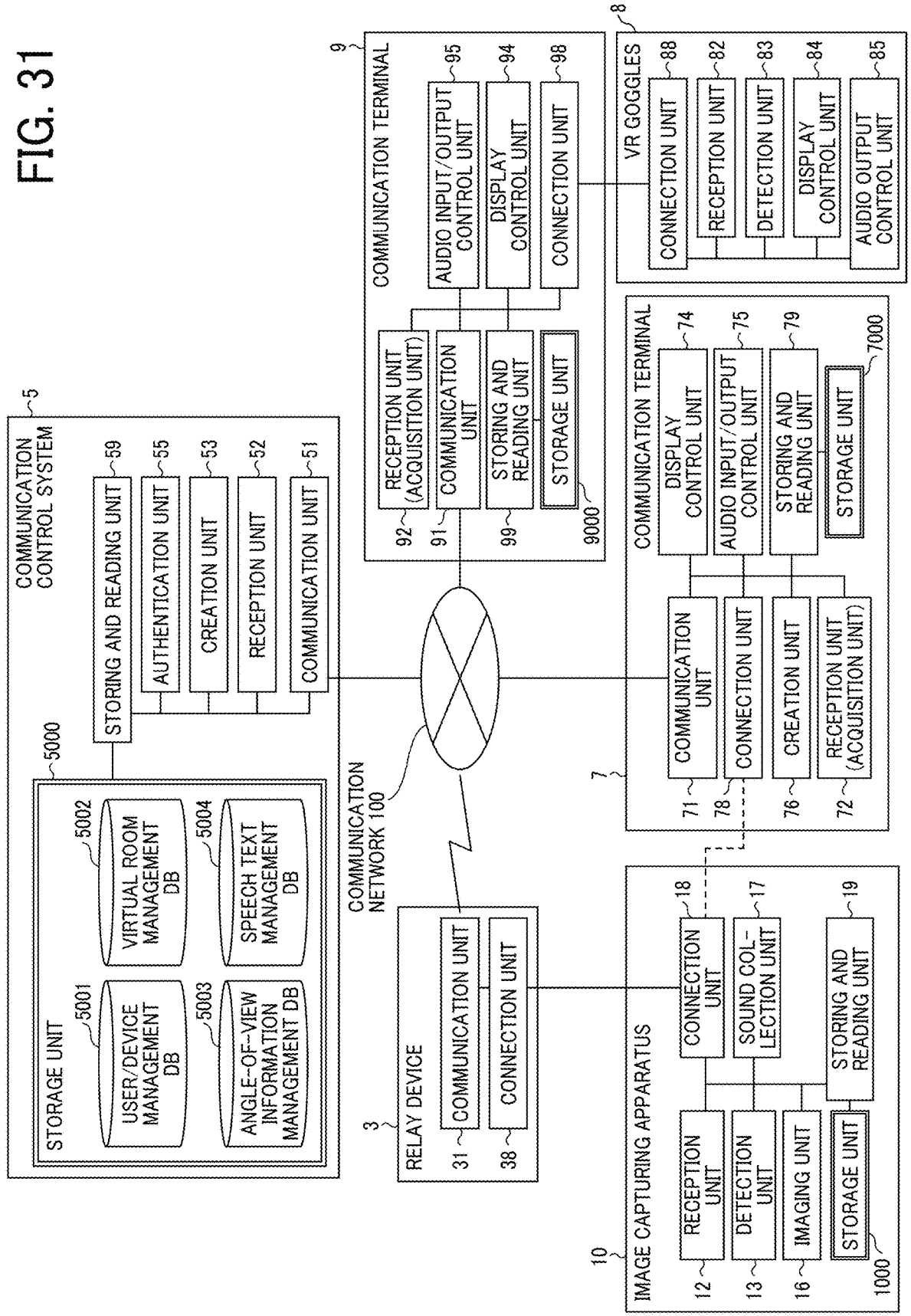
FIG. 31 is a block diagram illustrating an example functional configuration of the communication system according to the second embodiment.

FIG. 31 is a block diagram illustrating an example functional configuration of the communication system 1b according to the second embodiment.

Since the second embodiment is different from the first embodiment in that the VR goggles 8 are further included, the VR goggles 8 will be described hereinafter.

Functional Configuration of VR Goggles

As illustrated in FIG. 31, the VR goggles 8 include a reception unit 82, a detection unit 83, a display control unit 84, an audio output control unit 85, and a connection unit 88. The components of the VR goggles 8 are functions or means implemented by any one of the hardware elements illustrated in FIG. 28 operating in accordance with instructions from the CPU 801 according to a program for the VR goggles 8 loaded onto the RAM 803.

The reception unit 82 is mainly implemented by the operation unit 808 operating in accordance with instructions from the CPU 801. The reception unit 82 receives an operation input from the user (e.g., the participant A). In one embodiment, the reception unit 82 receives an input for enlarging or reducing the predetermined-area image being displayed. The reception unit 82 also serves as an acquisition unit. In response to receiving display of a predetermined area in a wide-view image from the user, the reception unit 82 acquires angle-of-view information for specifying the predetermined area.

The detection unit 83 is mainly implemented by the sensors (e.g., the electronic compass 818, the gyro sensor 819, and the acceleration sensor 820) operating in accordance with instructions from the CPU 801. For example, as the user changes the orientation of his or her head with the VR goggles 8 on, the detection unit 83 detects the change in the predetermined area such as the change from the predetermined area T illustrated in FIG. 6A to the predetermined area T' illustrated in FIG. 6C.

The display control unit 84 is mainly implemented by operation of the CPU 801. The display control unit 84 controls the display 807 of the VR goggles 8 to display various images based on content (wide-view image and audio information) data acquired from the outside through the connection unit 88.

The audio output control unit 85 is mainly implemented by operation of the CPU 801. The audio output control unit 85 controls the speaker 812 to output a sound.

Processes or Operations According to Second Embodiment

Next, processes or operations according to the second embodiment will be described with reference to FIG. 32. FIG. 32 is a sequence diagram illustrating a process for sharing VR content in the communication system 1b.

The following process is a process in which the communication terminal 7 uses the content data recorded in operation S36 illustrated in FIG. 18 and information stored in an angle-of-view information management DB in the storage unit 7000 to create VR content such as teaching materials. Examples of the VR content include a VR wide-view image and audio information.

S201: First, the reception unit 72 receives input of a voice-over or subtitles to recorded content data from the host X. Thus, the creation unit 76 creates VR content data.

S202: The communication unit 71 uploads (transmits) the VR content data, which has been recorded, to the predetermined content URL (the communication control system 5) received in, for example, operation S33. The VR content data includes an elapsed playback time from the start to the end of the recording. Thus, in the communication control system 5, the communication unit 51 receives the VR content data.

S203: In the communication control system 5, the storing and reading unit 59 stores the VR content data and the elapsed playback time in a predetermined content URL.

S204: The communication unit 51 transmits a content-viewable notification to the communication terminal 7 to notify the communication terminal 7 that the VR content is viewable. The content-viewable notification includes information indicating the predetermined content URL. Thus, the communication unit 71 of the communication terminal 7 receives the content-viewable notification.

S205: The communication unit 51 also transmits a content-viewable notification to the communication terminal 9a. The content-viewable notification includes information indicating the predetermined content URL. Thus, the communication unit 91 of the communication terminal 9a receives the content-viewable notification.

S206: The communication unit 51 also transmits a content-viewable notification to the communication terminal 9b. The content-viewable notification includes information indicating the predetermined content URL. Thus, the communication unit 91 of the communication terminal 9b receives the content-viewable notification.

In one embodiment, in operation S204, the content-viewable notification does not include the predetermined content URL.

As described above, the participant A uses the communication terminal 9a to perform the process illustrated in FIG. 21 to acquire the content data, the angle-of-view information (including the elapsed playback time), the angle-of-view information URL, and the information on the number of times of display from the communication control system 5. Then, the display control unit 94 of the communication terminal 9a generates a recording playback screen 750 as illustrated in FIG. 33. Further, the participant A connects the VR goggles 8 to the communication terminal 9a. Accordingly, in the VR goggles 8, the connection unit 88 acquires data of the recording playback screen 750 from the connection unit 98 of the communication terminal 9a. In the VR goggles 8, furthermore, for example, the display control unit 84 causes the display 807 to display the recording playback screen 750 as illustrated in FIG. 33. In other words, the display control unit 94 causes the display 807 to display the recording playback screen 750 via the display control unit 84. In the VR goggles 8, furthermore, in response to receipt of an operation from the participant A, the reception unit 82 transmits data (signal) indicating the content of the operation to the reception unit 92 of the communication terminal 9a via the connection unit 88 and the connection unit 98.

FIG. 33 illustrates an example of the recording playback screen 750, which is displayed initially. FIG. 34 illustrates an example of the recording playback screen 750 displayed in response to selection of a predetermined display area (a speech-duration display area or a speech-content display area). The recording playback screen 750 illustrated in FIGS. 33 and 34 is related to a medical site. FIG. 33 corresponds to FIG. 24, and FIG. 34 corresponds to FIG. 26. A speech-content display area 785 illustrated in FIG. 34 corresponds to the speech-content display area 784 illustrated in FIG. 26, but is different in the content of the text.

As described above, in addition to the effects of the first embodiment, an embodiment of the present disclosure enables viewing of VR content.

Since the VR content includes a voice-over and subtitles, the user (e.g., the participant A) can also use the VR content as teaching materials.

While some embodiments of the present disclosure have been described, the present disclosure is not limited to such embodiments. Various modifications and substitutions may be made to the present disclosure without departing from the spirit of the present disclosure.

(1) Each of the functions in the embodiments described above may be implemented by one or more processing circuits or circuitry. As used herein, the term "processing circuit or circuitry" includes processors programmed to implement each function by software, such as a processor implemented by an electronic circuit, and devices designed to implement the functions described above, such as an application specific integrated circuit (ASIC), a digital signal processor (DSP), a field programmable gate array (FPGA), and existing circuit modules.

(2) The programs described above may be stored in (non-transitory) recording media such as digital versatile disc-read only memories (DVD-ROMs), and such (non-transitory) recording media may be provided in the form of program products to domestic or foreign users.

(3) Each of the CPUs 111, 301, 501, and 801 serves as a processor, and multiple processors may be included in a single device or apparatus.

Any one of the above-described operations may be performed in various other ways, for example, in an order different from the one described above.

The invention claimed is:

1. A display terminal for playing back a predetermined area of a wide-view image that is recorded, the display terminal comprising:
a display to display a first display area and a second display area,
the first display area being a display area related to a first recording duration in which a first speech is made when a first predetermined area of the wide-view image is being displayed by a first display terminal,
the second display area being a display area related to a second recording duration in which a second speech is made when a second predetermined area of the wide-view image is being displayed by a second display terminal; and
circuitry configured to:
receive selection of the second display area during display of a first predetermined-area image indicating the first predetermined area corresponding to the first display area, the first predetermined-area image being an image displayed on the first display terminal during the first recording duration, and
control the display to display a second predetermined-area image indicating the second predetermined area corresponding to the second display area in response to receipt of selection of the second display area, the second predetermined-area image being an image displayed on the first display terminal during the second recording duration.

2. The display terminal according to claim 1, wherein;
the circuitry is further configured to control the display to switch from the first predetermined-area image to the second predetermined-area image and display the second predetermined-area image.

3. The display terminal according to claim 1, wherein;
the circuitry is further configured to control the display to display the first display area and the second display area in chronological order of speeches, based on the first recording duration and the second recording duration.

4. The display terminal according to claim 1, wherein the circuitry is further configured to control the display to:
display a first text in the first display area, the first text being a text of the first speech made using the first display terminal in the first recording duration during recording of the wide-view image; and display a second text in the second display area, the second text being a text of the second speech made using the second first display terminal in the second recording duration during recording of the wide-view image.

5. The display terminal according to claim 4, wherein;
the circuitry is further configured to control the display to display the first display area and the second display area in chronological order of speeches, based on the first recording duration and the second recording duration.

6. A communication system, comprising:
display terminals that play back a predetermined area of a wide-view image that is recorded; and
an information management system that manages information to be transmitted to the display terminal terminals,
the information management system including circuitry configured to create a first text and a second text and transmit the first text and the second text to the display terminal terminals,
the first text being a text of a first speech made in a first recording duration in which the first speech is made when a first predetermined area in the wide-view image is being displayed by a first display terminal of the display terminals,
the second text being a text of a second speech made in a second recording duration in which the second speech is made when a second predetermined area in the wide-view image is being displayed by a second display terminal of the display terminals, and
each of the display terminals including:
a display configured to display a first display area and a second display area, the first display area including the first text that is received, the second display area including the second text that is received; and
another circuitry configured to
receive selection of the second display area during display of a first predetermined-area image indicating the first predetermined area corresponding to the first display area, the first predetermined-area image being an image displayed on the first display terminal during the first recording duration, and
control the display to display a second predetermined-area image indicating the second predetermined area corresponding to the second display area in response to receipt of selection of the second display area, the second predetermined-area image being an image displayed on the first display terminal during the second recording duration.

7. The communication system according to claim 6, wherein:
the another circuitry is further configured to control the display to switch from the first predetermined-area image to the second predetermined-area image and display the second predetermined-area image.

8. The communication system according to claim 6, wherein:
the another circuitry is further configured to control the display to display the first display area and the second display area in chronological order of speeches, based on the first recording duration and the second recording duration.

9. A display method for playing back a predetermined area of a wide-view image that is recorded, the display method comprising: displaying a first display area and a second display area; on a display, the first display area being a display area related to a first recording duration in which a first speech is made when a first predetermined area in the wide-view image is being displayed by a first display terminal, the second display area being a display area related to a second recording duration in which a second speech is made when a second predetermined area in the wide-view image is being displayed by a second the first display terminal; and receiving selection of the second display area during display of a first predetermined-area image indicating the first predetermined area corresponding to the first display area, the first predetermined-area image being an image displayed on the first display terminal during the first recording duration, wherein the displaying includes displaying, a second predetermined-area image indicating the second predetermined area corresponding to the second display area in response to receipt of selection of the second display area, the second predetermined-area image being an image displayed on the first display terminal during the second recording duration.

10. The method according to claim 9, further comprising:
controlling the display to switch from the first predetermined-area image to the second predetermined-area image and display the second predetermined-area image.

11. The method according to claim 9, further comprising:
further comprising controlling the display to display the first display area and the second display area in chronological order of speeches, based on the first recording duration and the second recording duration.

12. The method according to claim 9, further comprising:
controlling the display to: display a first text in the first display area, the first text being a text of the first speech made using the first display terminal in the first recording duration during recording of the wide-view image; and display a second text in the second display area, the second text being a text of the second speech made using the second display terminal in the second recording duration during recording of the wide-view image.

13. The method according to claim 12, further comprising:
controlling the display to display the first display area and the second display area in chronological order of speeches, based on the first recording duration and the second recording duration.

\* \* \* \* \*